April 23, 1940.　　　J. B. ARMITAGE　　　2,198,102

MACHINE TOOL TRANSMISSION AND CONTROL MECHANISM

Filed May 15, 1937　　　13 Sheets-Sheet 1

INVENTOR
JOSEPH B. ARMITAGE
BY W. D. O'Connor
ATTORNEY

April 23, 1940. J. B. ARMITAGE 2,198,102
MACHINE TOOL TRANSMISSION AND CONTROL MECHANISM
Filed May 15, 1937 13 Sheets-Sheet 2
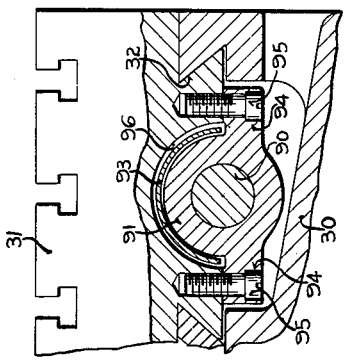
INVENTOR
JOSEPH B. ARMITAGE
BY W. D. O'Connor
ATTORNEY

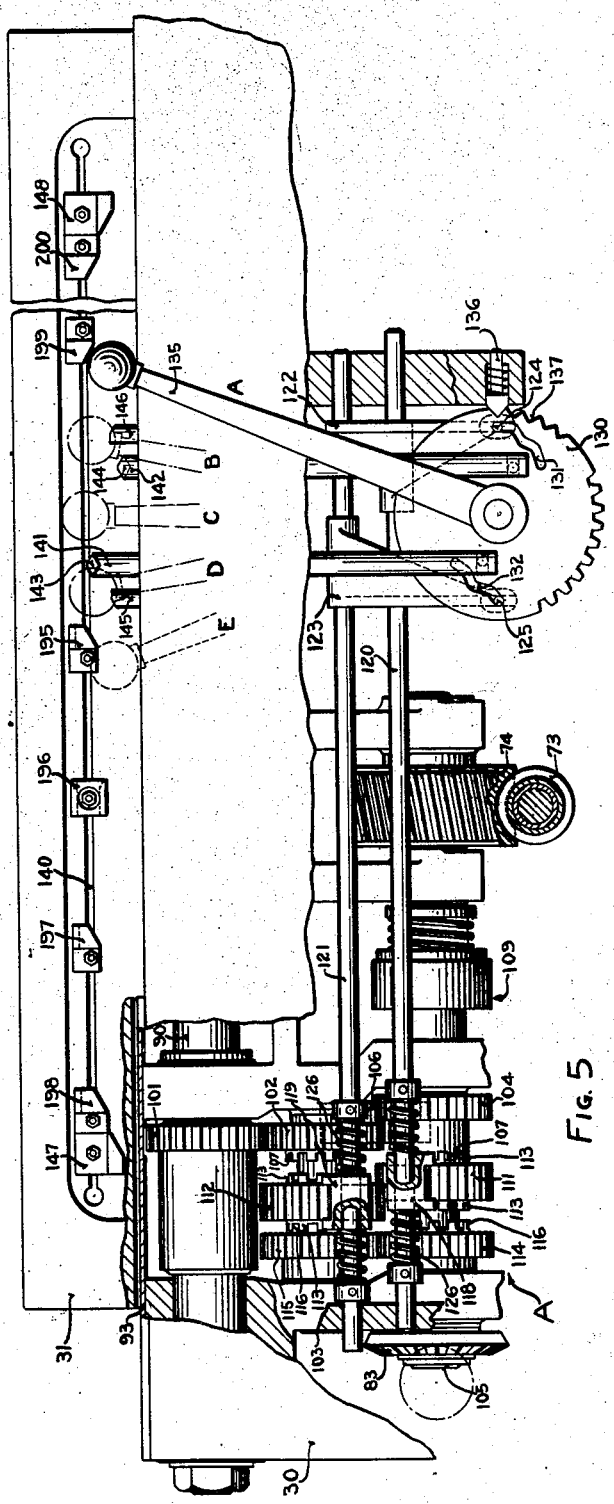

INVENTOR
JOSEPH B. ARMITAGE
BY W. D. O'Connor
ATTORNEY

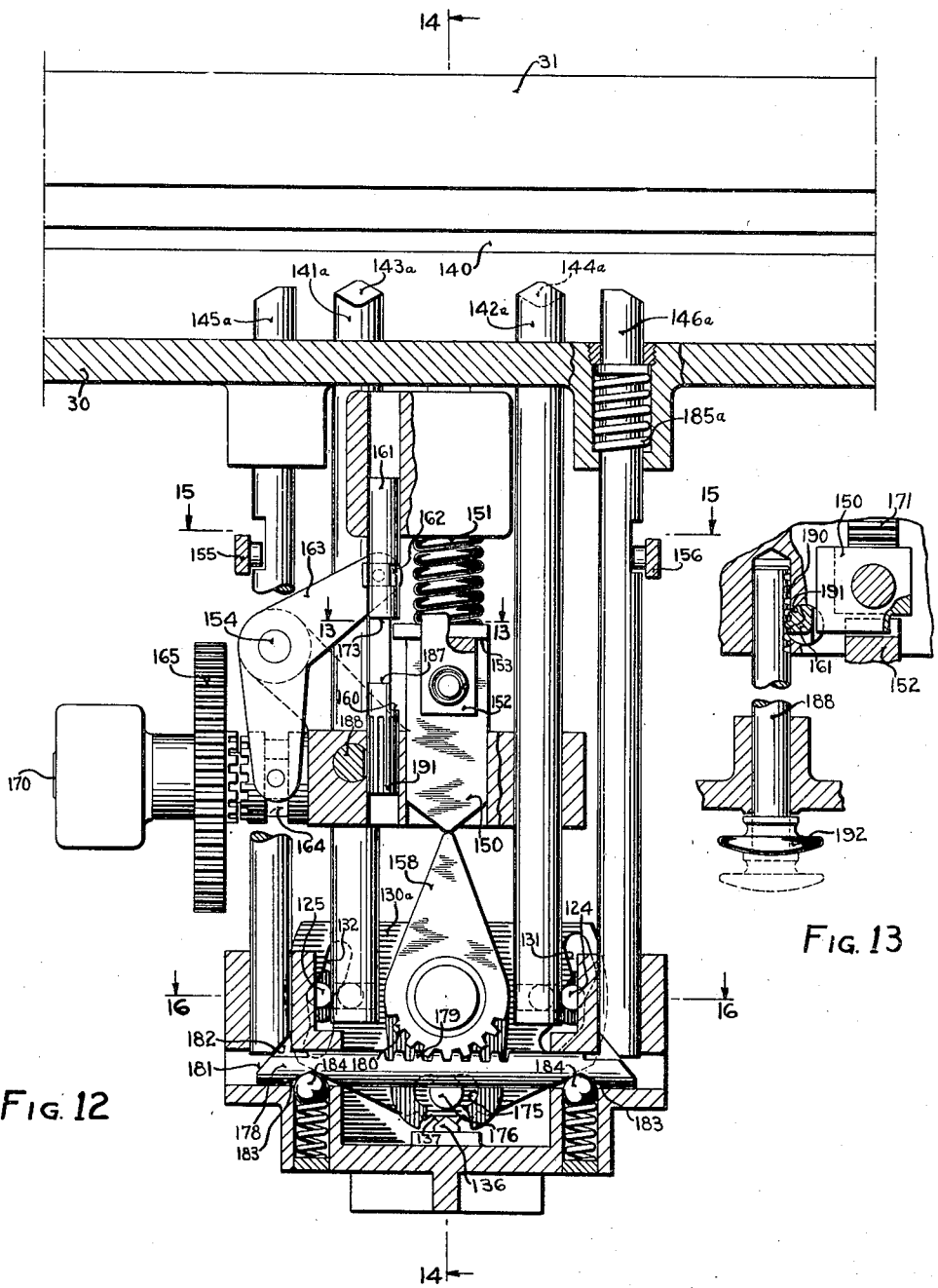

April 23, 1940.  J. B. ARMITAGE  2,198,102

MACHINE TOOL TRANSMISSION AND CONTROL MECHANISM

Filed May 15, 1937  13 Sheets-Sheet 7

INVENTOR
JOSEPH B. ARMITAGE
BY W. D. O'Connor
ATTORNEY

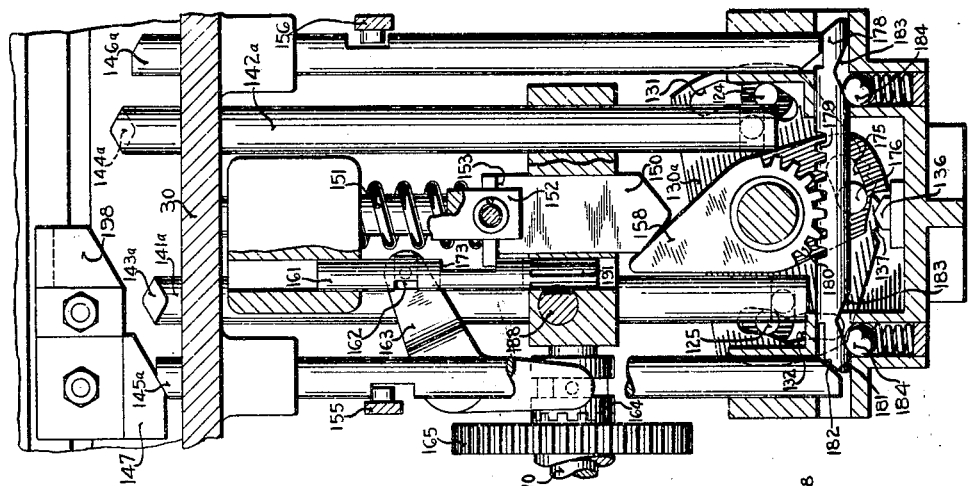
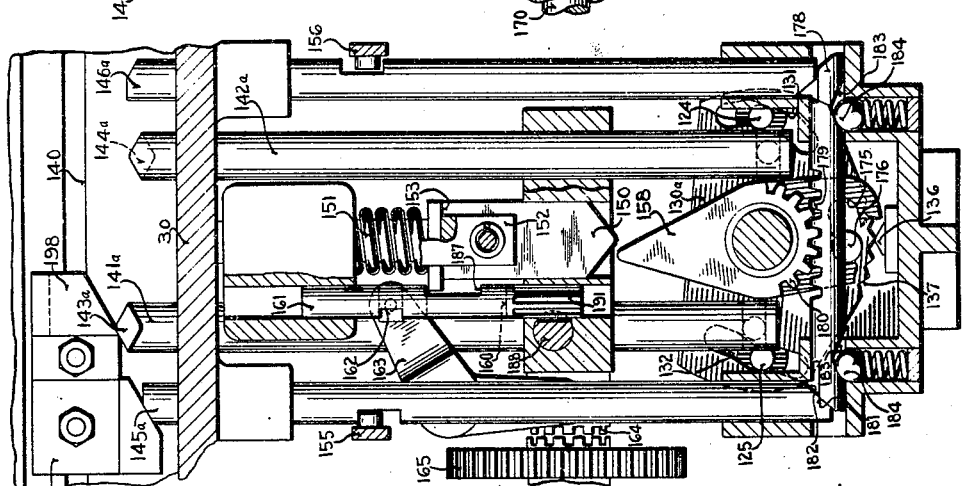
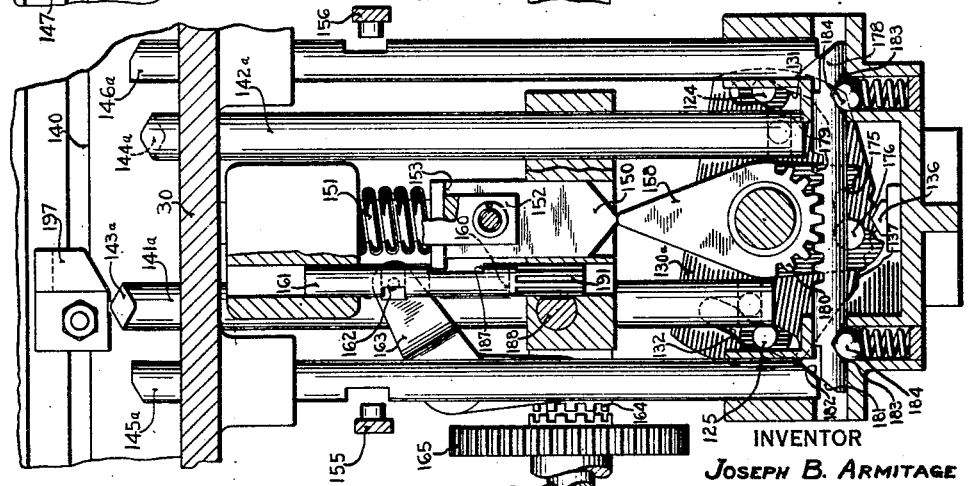

INVENTOR
JOSEPH B. ARMITAGE
BY W. D. O'Connor
ATTORNEY

April 23, 1940. J. B. ARMITAGE 2,198,102
MACHINE TOOL TRANSMISSION AND CONTROL MECHANISM
Filed May 15, 1937 13 Sheets-Sheet 10

INVENTOR
JOSEPH B. ARMITAGE
BY W. D. O'Connor
ATTORNEY

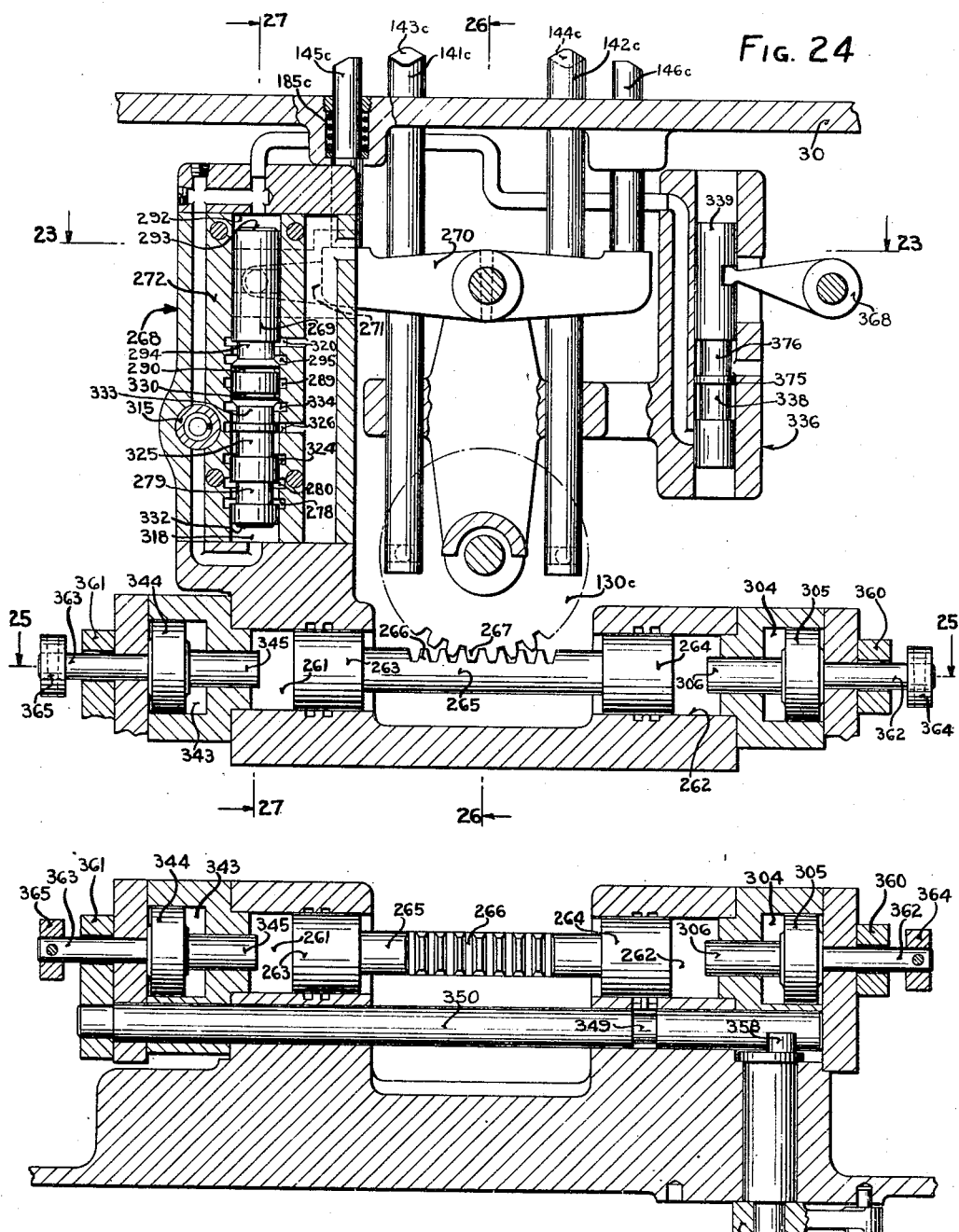

April 23, 1940.　　　J. B. ARMITAGE　　　2,198,102
MACHINE TOOL TRANSMISSION AND CONTROL MECHANISM
Filed May 15, 1937　　　13 Sheets-Sheet 12
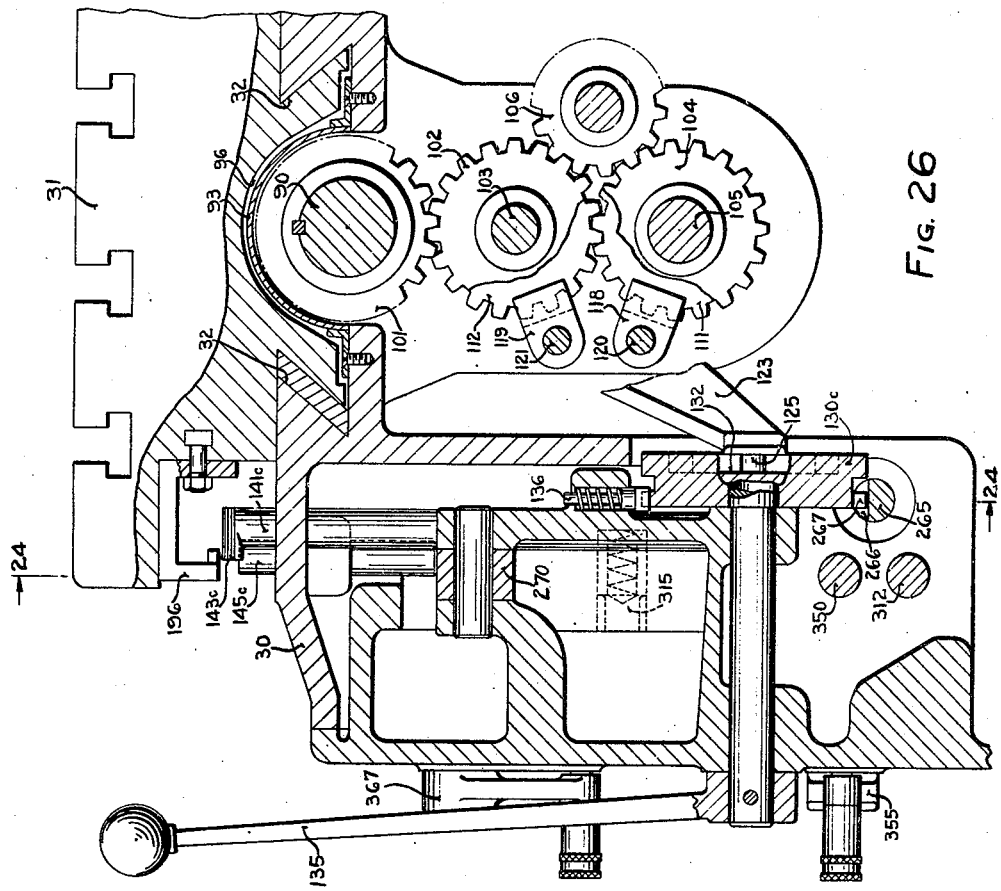
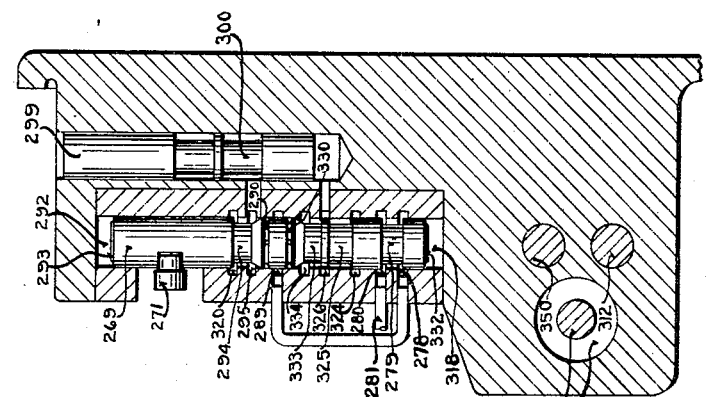
INVENTOR
Joseph B. Armitage
BY W. D. O'Connor
ATTORNEY

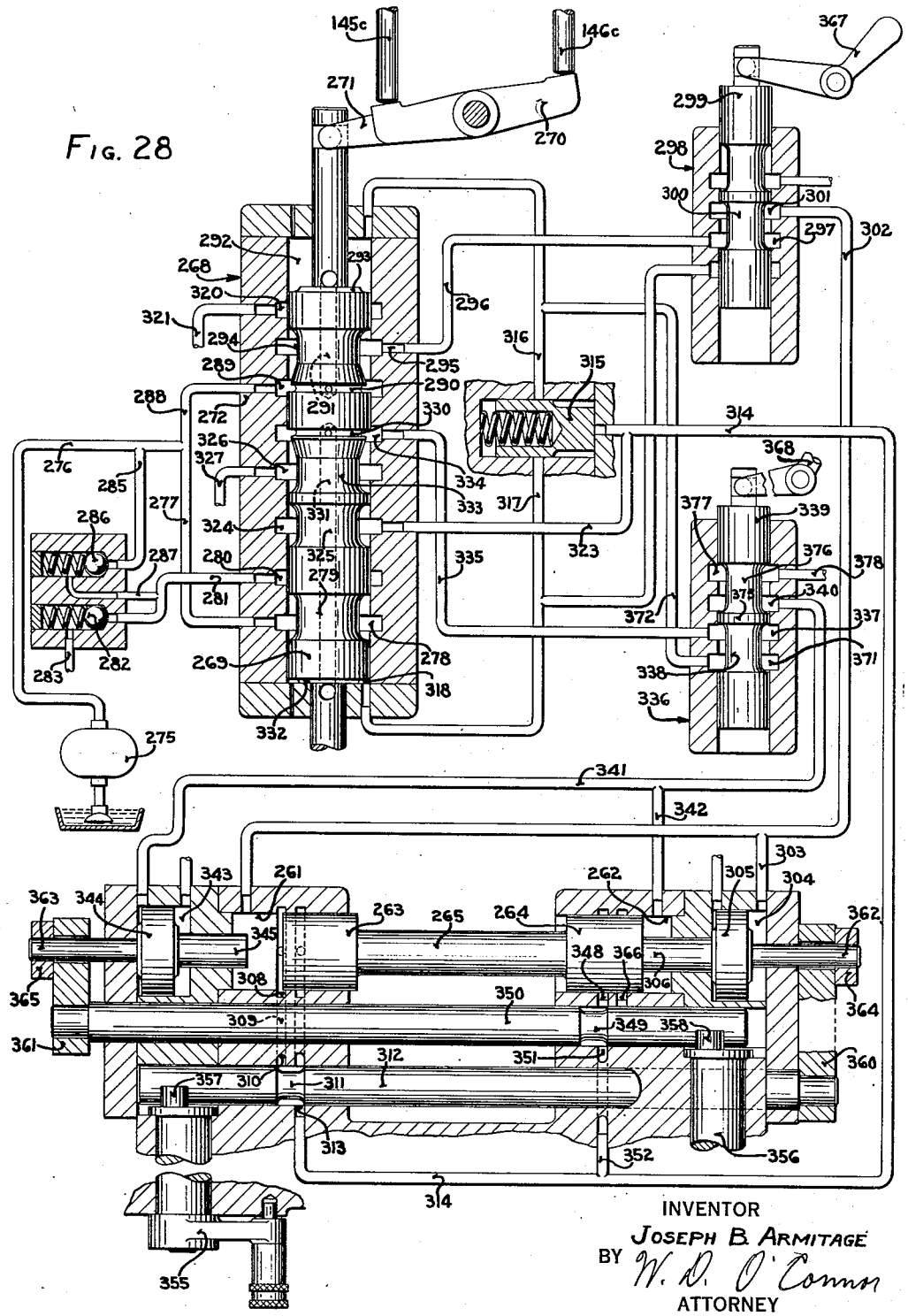

Patented Apr. 23, 1940

2,198,102

UNITED STATES PATENT OFFICE 2,198,102

MACHINE TOOL TRANSMISSION AND CONTROL MECHANISM

Joseph B. Armitage, Wauwatosa, Wis., assignor to Kearney & Trecker Corporation, West Allis, Wis., a corporation of Wisconsin Application May 15 1937, Serial No. 142,781

46 Claims. (Cl. 90—21)

This invention relates generally to machine tools, and more particularly to improved transmission and control mechanism for a machine tool.

A general object of the invention is to provide an improved transmission mechanism and control apparatus for actuating and automatically controlling a movable element of a machine tool.

Another object of the invention is to provide an improved transmission mechanism and control apparatus therefor that may be adjusted readily to effect any one of several modes of automatic operation.

Another object is to provide improved rate changing and reversing mechanism for the power transmission train of a machine tool.

Another object is to provide in a machine tool an improved rate-changing and reversing mechanism that may be operated either manually or automatically.

Another object is to provide an improved rate-changing and reversing mechanism embodying mechanical clutches arranged for selective engagement to effect movement in either direction at either of two rates of speed.

Another object is to provide a rate-changing and reversing mechanism utilizing mechanical clutches and having control means arranged to prevent engagement of the clutches in undesired combinations.

Another object is to provide control mechanism for the clutches of a rate-changing and reversing mechanism having means to engage the clutches in pre-selected combinations to effect operation at a selected rate in either direction.

Another object is to provide control mechanism for the clutches of a mechanical rate-changing and reversing mechanism having a single element movable to effect five combinations of positions of the clutches including a neutral position and positions resulting in operation at either of two speeds in either direction.

Another object is to provide an improved reversing mechanism for a machine tool transmission.

Another object is to provide an improved reversing mechanism for a machine tool transmission utilizing auxiliary power means to effect automatic reversal.

Another object is to provide an automatic reversing mechanism for a machine tool transmission that may be adjusted readily to effect reversal of a driven machine element or to stop the movement thereof selectively at either or both ends of its stroke.

Another object is to provide automatic reversing mechanism for a machine tool transmission that may be adjusted to effect reverse movement accurately and selectively at either of two rates of speed.

Another object is to provide an improved mechanical rate-changing and reversing mechanism for a milling machine table, having a power actuated reversing device that is adjustable to effect reverse movement either at rapid traverse rate or at feed rate.

Another object is to provide an improved reversing control mechanism actuated by power derived from the mechanical transmission mechanism.

Another object is to provide an improved electrically actuated automatic reversing mechanism for a machine tool transmission.

Another object is to provide an improved reversing mechanism having hydraulically actuated automatic reversing means.

A further object is to provide an improved hydraulic control system for a machine tool.

According to this invention, an improved transmission mechanism for driving a movable element of a machine tool—for example, the work table of a milling machine, is arranged to be adjusted manually or automatically to effect movement of the table in either direction and at either of two rates. Adjustment of the mechanism is effected by engaging or disengaging mechanical clutches, an over-running clutch being provided for driving the mechanism at the lower rate of speed in order that transition from one rate of speed to the other may be effected without stopping movement of the table. The mechanical clutches are controlled by a cam shifting mechanism arranged to effect a predetermined sequence of clutch engagements and to prevent engagement of the clutches in inoperative combinations, a single control lever being provided for moving the cam to effect manual shifting of the clutches. Automatic change in rate is effected in response to movement of the table by positively operating trip dogs acting directly upon the cam shifting mechanism. To effect reversal of the direction of movement automatically in response to table movement, supplemental dog operated power reversing mechanism is provided for moving the clutches through neutral position. The supplemental power reversing mechanism may be actuated mechanically from the table transmission mechanism, or it may be actuated electrically or by means of hydraulically operated power elements. Control means are provided for adjusting the mechanism to effect reversal at either of the two rates of speed or to render the reversing mechanism non-responsive to movement of the table in either or both directions of travel.

The invention is exemplified herein by three embodiments thereof, illustrating the mechanical, the electrical, and the hydraulic power reversing mechanism respectively; however, it is to be understood that these particular embodiments are illustrative only, and that various other structural forms within the range of equivalents of the features defined in the claims may be employed in practicing the invention.

The foregoing and other objects of the invention, which will become more fully apparent from the following detailed descriptions of mechanisms exemplifying the three preferred embodiments thereof, may be achieved by the apparatus described herein in connnection with the accompanying drawings, in which:

Fig. 2 is a view in vertical section of parts of the machine taken longitudinally of the work table, substantially on the plane represented by the line 2—2 in Fig. 1, and showing the table-driving, rate-selecting and reversing mechanism.

Fig. 3 is a fragmentary view partly in transverse section taken on the plane represented by the line 3—3 in Fig. 2, showing the table driving screw and nut mechanism and the table screw guard.

Fig. 4 is a fragmentary view in front elevation of the clutch shifting mechanism for the rate selecting and reversing apparatus.

Fig. 5 is a fragmentary view in front elevation generally similar to Fig. 2 but with the clutch shifting apparatus of Fig. 4 superimposed thereon, and with control mechanism for the clutches shown partly in diagram in its operating relationship therewith.

Figs. 6, 7, and 8 are fragmentary views showing the rate selecting and reversing clutches of Figs. 2 and 5 in their different operating relationship for effecting the various modes of operation of the mechanism.

Figure 9:
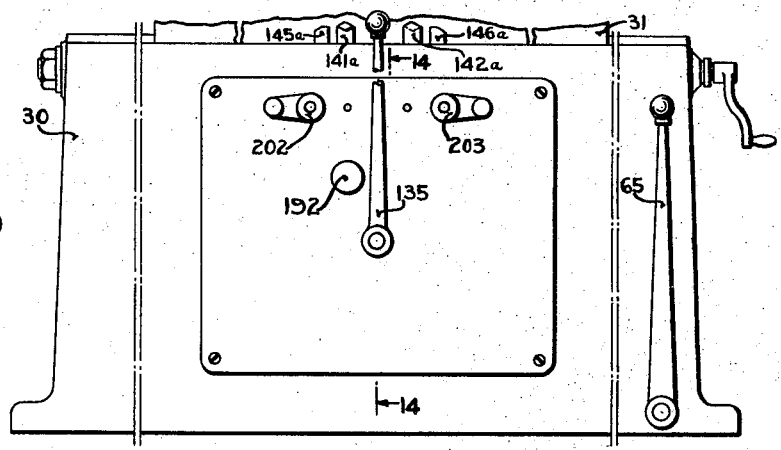
Figure 10:
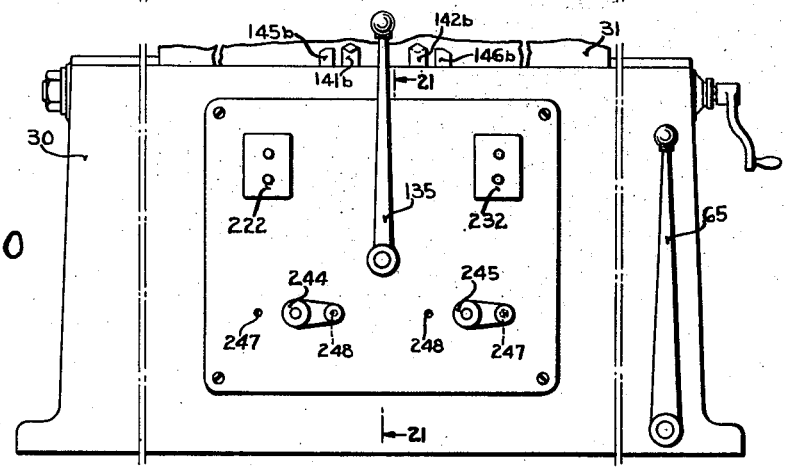
Figure 11:
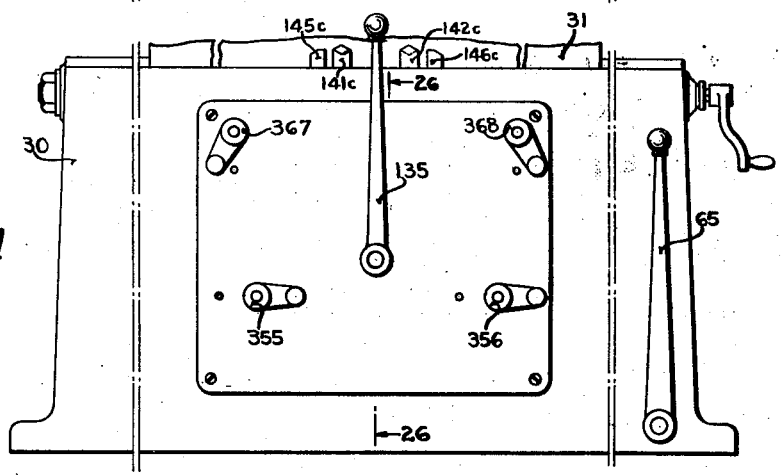

Figs. 9, 10, and 11 are views in front elevation of the lower part of the machine, showing the respective control panels and operating levers for the mechanical, the electrical, and the hydraulic power reversing apparatus constituting the three embodiments of the invention herein disclosed.

Figure 14:
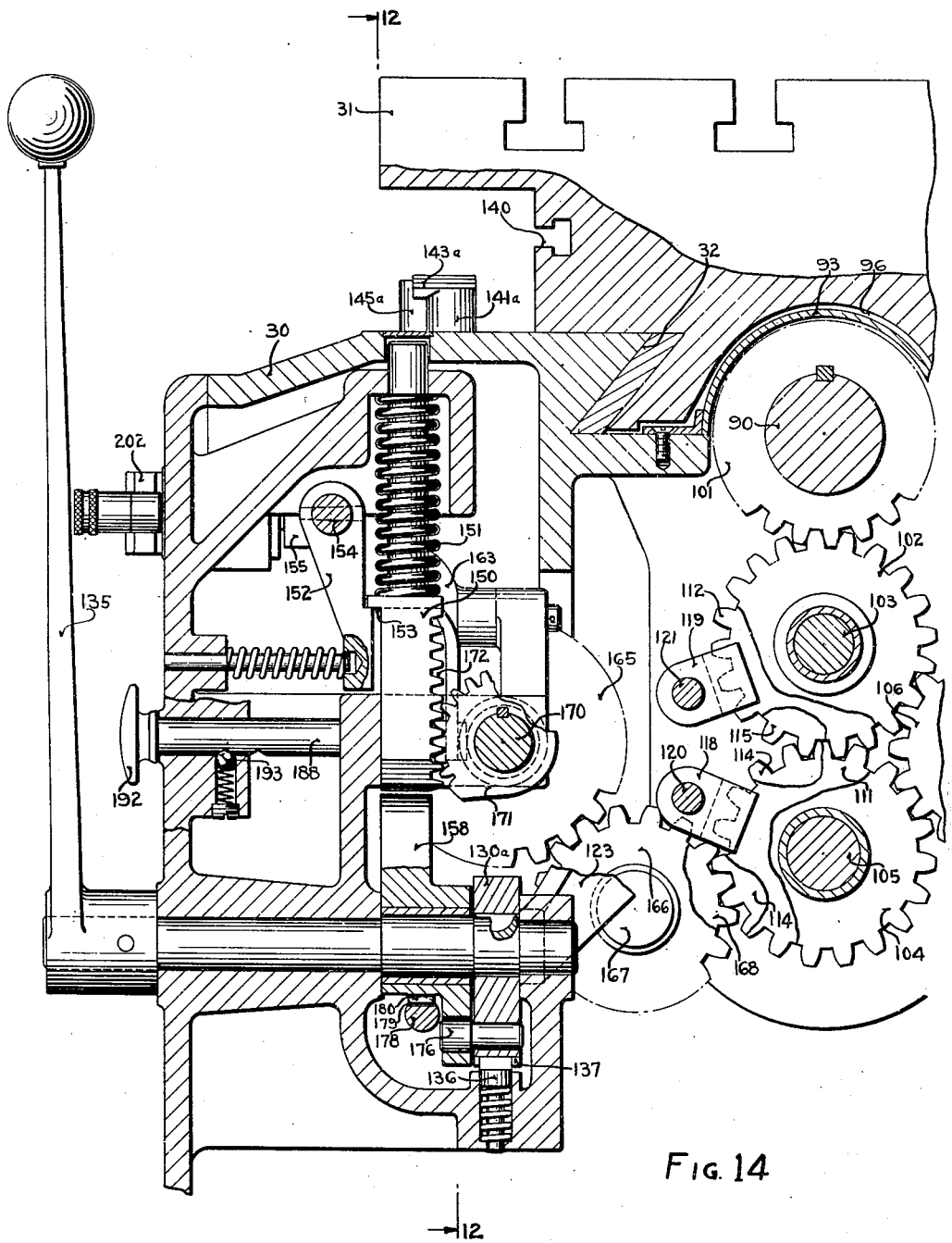

Fig. 12 is a frontal view, partly in section substantially on the plane represented by the line 12—12 in Fig. 14, showing the control apparatus for effecting automatic reversal by mechanically actuated supplemental power means.

Fig. 13 is a detailed fragmentary view in horizontal section substantially on the plane represented by the line 13—13 in Fig. 12.

Fig. 14 is a view in vertical transverse section of the mechanical reversing mechanism taken substantially on the plane represented by the line 14—14 in Figs. 9 and 12.

Figure 15:
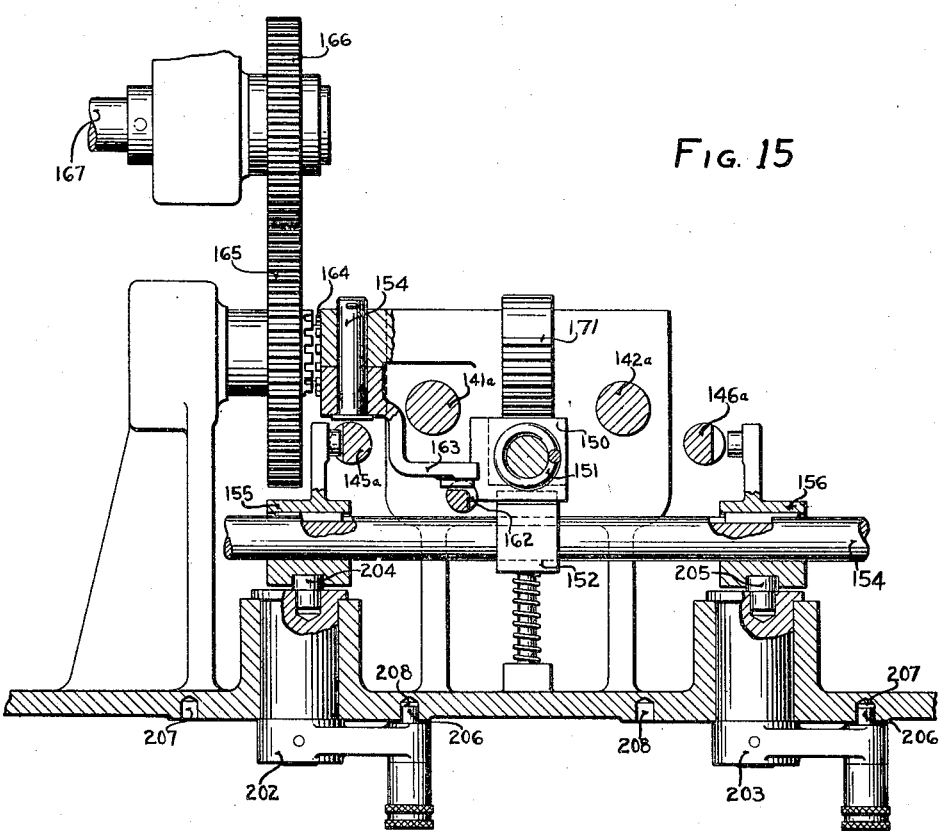

Fig. 15 is a view in horizontal section of the mechanical reverse mechanism taken substantially on the plane represented by the line 15—15 in Fig. 12.

Figure 16:
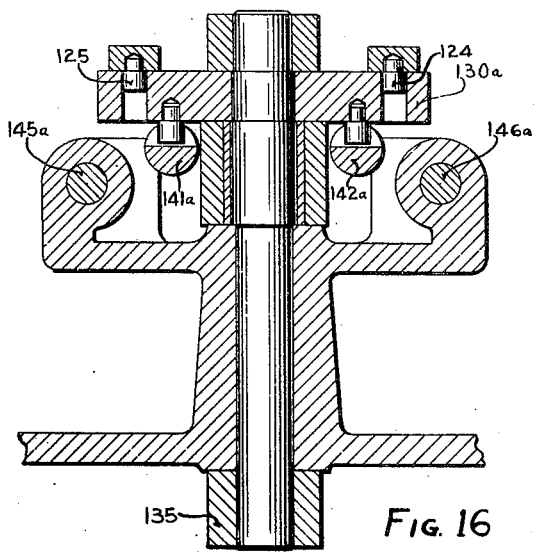

Fig. 16 is a detailed view in horizontal section of the shifting cam and associated control rods, taken on the plane represented by the line 16—16 in Fig. 12.

Figs. 17, 18, and 19 are frontal views similar to Fig. 12 but showing the mechanical reversing mechanism in various positions assumed during a power reversing operation.

Figure 20:
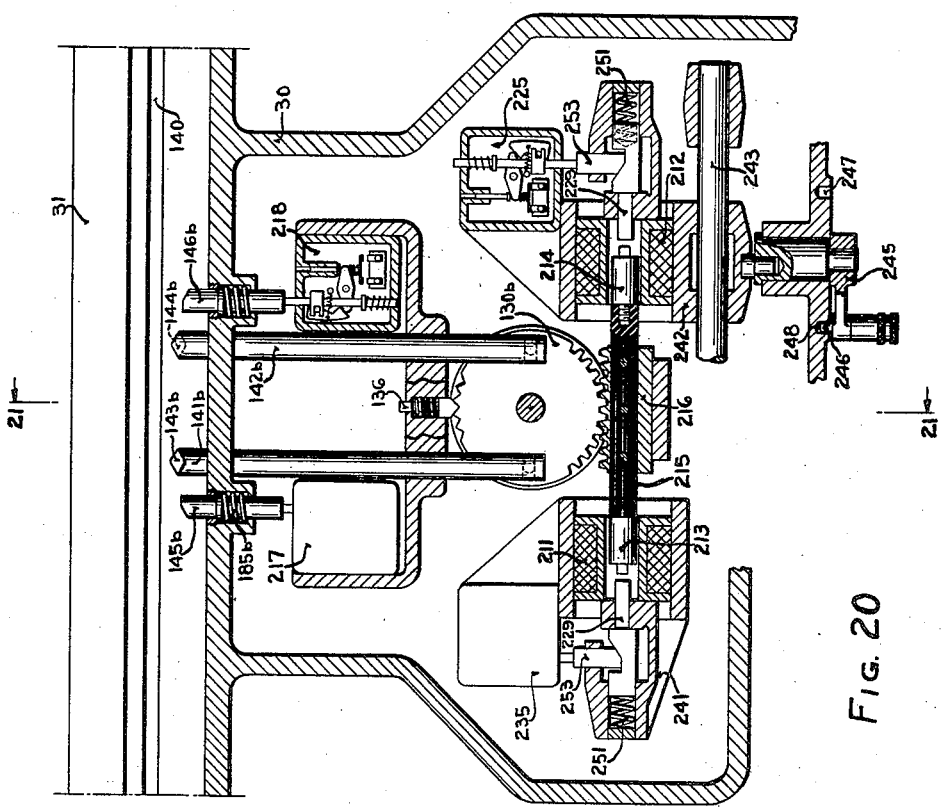

Fig. 20 is a diagrammatic frontal view generally similar to Fig. 12 but showing apparatus for effecting automatic reversal by electrical means.

Figure 21:
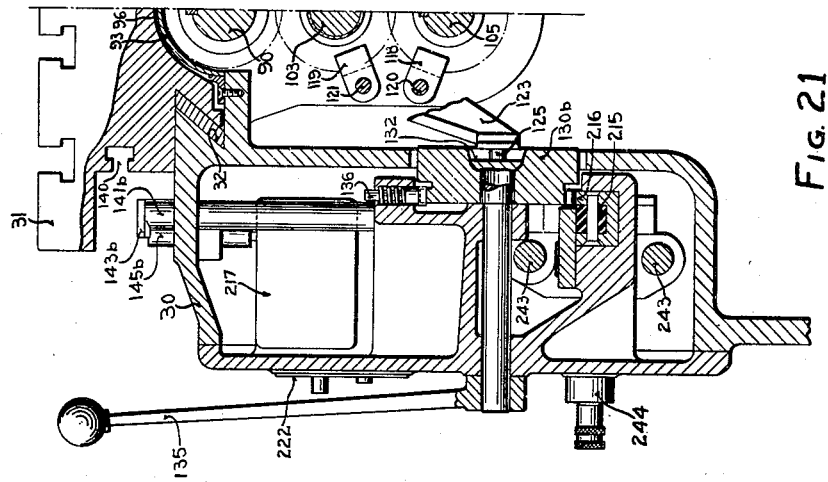

Fig. 21 is a view in vertical transverse section generally similar to Fig. 14 but showing the electrical reversing mechanism, taken substantially on the plane represented by the lines 21—21 in Figs. 10 and 20.

Figure 22:
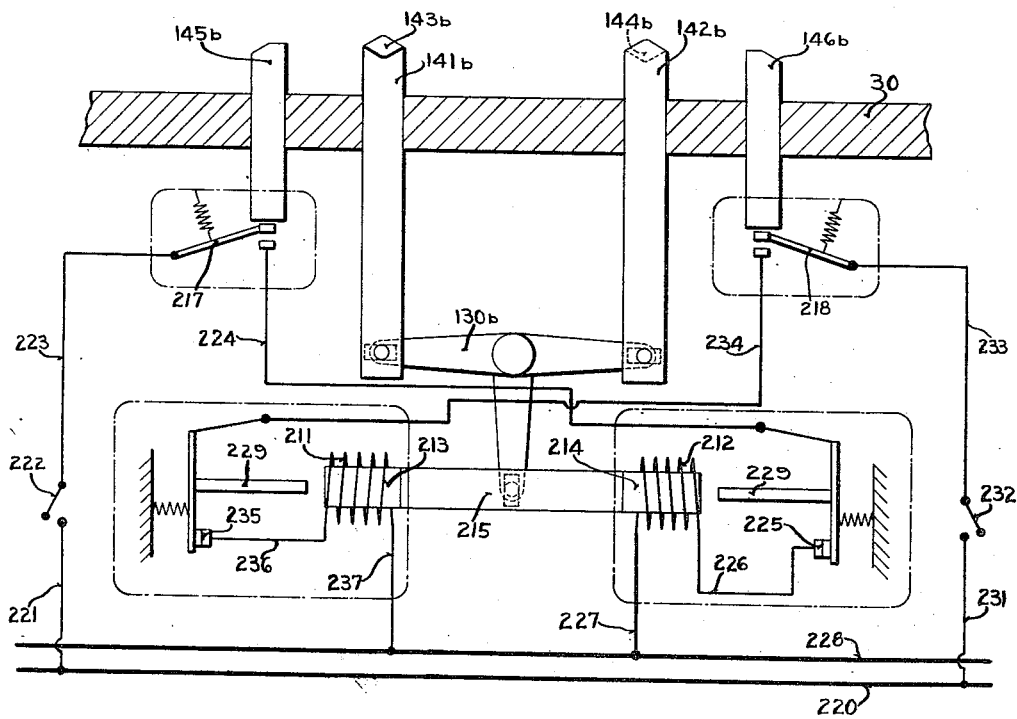

Fig. 22 is a schematic wiring diagram of the electrical control circuit for the electrically operated automatic reverser.

Figure 23:
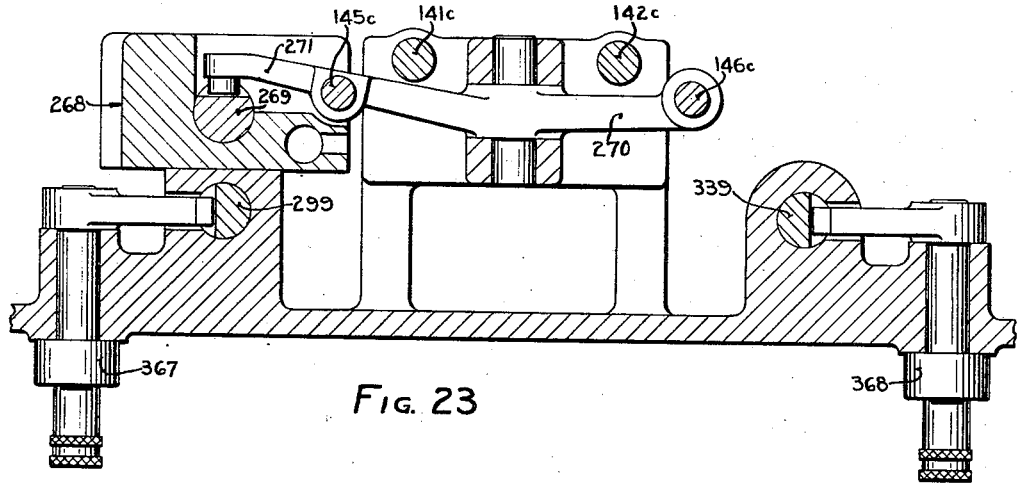

Fig. 23 is a view in horizontal section in part of the hydraulic reversing mechanism taken on the plane represented by the line 23—23 in Fig. 24.

Fig. 24 is a partially diagrammatic frontal view taken largely in vertical section on the plane represented by the line 24—24 in Fig. 26 and generally similar to Figs. 12 and 20 but showing the apparatus for effecting automatic reversal by hydraulically operated means.

Fig. 25 is a view in horizontal section showing somewhat diagrammatically parts of the control mechanism for the hydraulic reverser, taken substantially on the plane represented by the line 25—25 in Fig. 24.

Fig. 26 is a view in vertical transverse section generally similar to Figs. 14 and 21 but showing the hydraulic reversing mechanism taken substantially on the plane represented by the line 26—26 in Figs. 11 and 24.

Fig. 27 is a fragmentary view in vertical section of part of the hydraulic control mechanism taken on the plane represented by the line 27—27 in Fig. 24; and Fig. 28 is a schematic diagram of the hydraulic control circuit for the hydraulically operated automatic reverser.

The particular machine tool illustrated in the drawings as exemplifying apparatus of the class in which the present invention may be embodied, is a milling machine of the bed type shown as viewed from the left side, some of the details of mechanism not directly concerned with the present invention having been omitted for the sake of more clearly showing the major elements.

Figure 1:
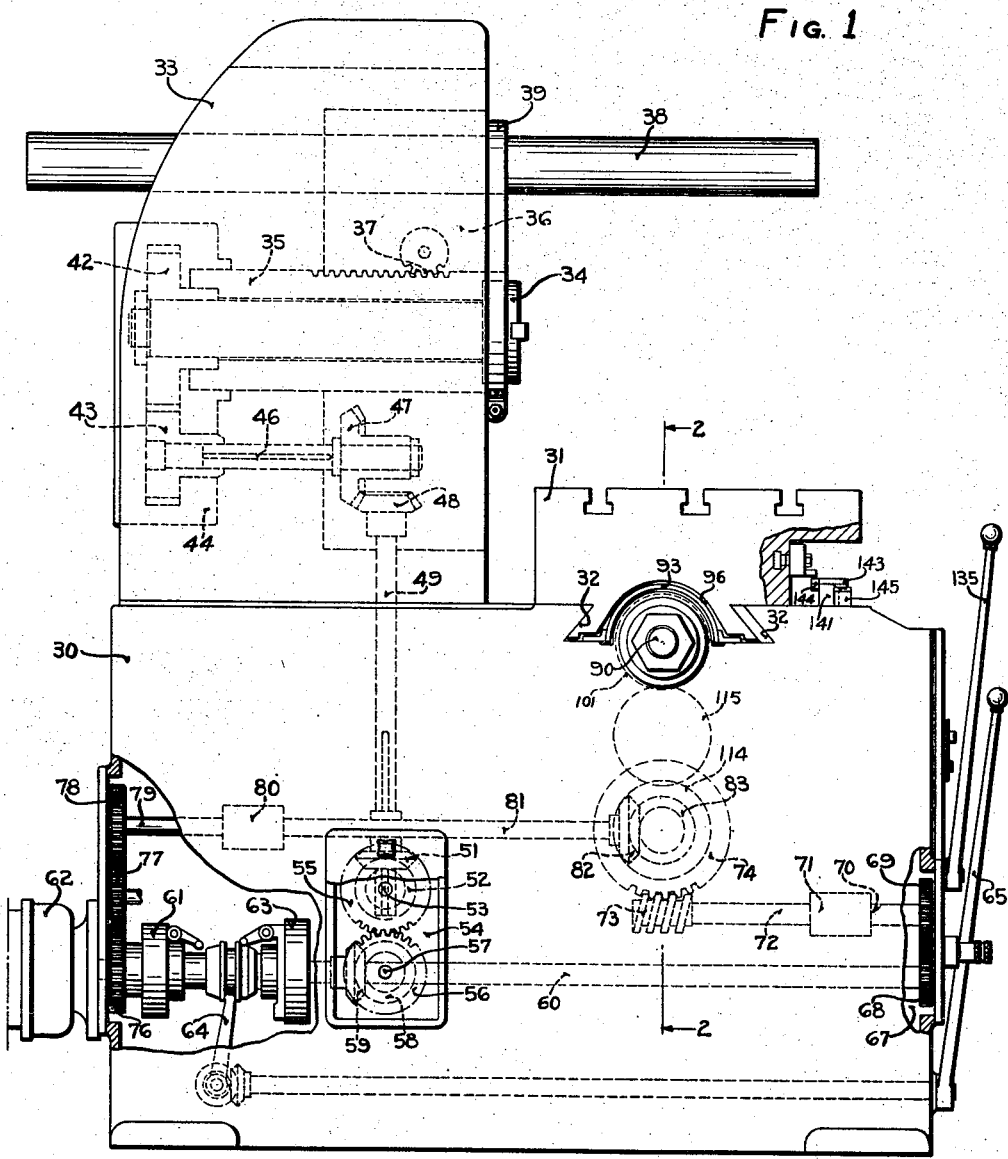
Figure 1 is a view in left side elevation of a milling machine exemplifying a machine tool of the type in which the present invention may be incorporated, parts of the machine frame having been broken away to show the internal driving mechanism.

Referring more particularly to the drawings, and especially to Fig. 1 thereof, the milling machine there generally depicted comprises essentially a hollow frame or bed 30, constituting the main body or base of the machine and forming a housing for the transmission and controlling mechanism embodying the invention. On its upper surface adjacent to its forward edge, the bed 30 carries a work supporting table 31 that is slidably mounted in ways 32 for longitudinal reciprocatory movement relative to the bed. Mounted on the bed 30 back of the table 31 is an upstanding column 33 that carries a rotatable tool supporting spindle 34 for mounting a rotary cutting tool in cooperating relationship with a workpiece carried by the work-supporting table 31.

To provide for movement of the spindle 34 in a plane transverse to the table 31, the spindle is journaled in a quill 35 that is slidably mounted for horizontal axial movement in a spindle-carrying head 36, a rack and pinion mechanism 37 being provided for effecting movement of the quill. A pair of overarms 38 are slidably mounted in the spindle carrying head 36 above the quill 35 for supporting a cutter arbor in well-known manner, the arms being also arranged to support the quill by means of a yoke 39 when it is extended forwardly from the column 33.

To provide for vertical movement of the spindle 34 relative to the table 31, the entire spindle-carrying head 36 is slidably mounted in the column 33 in such manner that it may be adjusted vertically to any predetermined position and clamped there by well-known means not shown. By these adjustments relative movement between a cutter and a workpiece may be effected in three mutually normal planes.

For rotating a cutting tool in operating upon a workpiece, the spindle 34 is provided at its inner end with a driving gear wheel 42 which meshes with a pinion 43 carried by a housing 44 that is attached to the quill 35, the gear and pinion constituting a reduction drive mechanism for the spindle. Power is transmitted to the pinion 43 by means of a horizontally disposed splined shaft 46, which is journaled in the head 36 and has sliding connection with the pinion to accommodate the longitudinal movement of the quill 35 relative to the head. The splined shaft 46 is provided within the head 36 with a bevel gear 47 which meshes with a bevel gear 48 on the upper end of a vertically disposed shaft 49, also journaled in and carried by the head 36. The vertical shaft 49 has splined connection at its lower end with a bevel gear 51 that is journaled in the bed 30, the arrangement being such that the sliding head 36 and the shaft 49 may move vertically while maintaining driving connection with the gear 51.

The bevel gear 51 in the bed 30 meshes with a cooperating bevel gear 52 mounted on the inner end of a horizontal shaft 53 which extends outward into an accessible speed changer compartment 54 at the left side of the machine. Detachably mounted on the outer end of the shaft 53 is a pick-off gear 55 which meshes with a complementary pick-off gear 56 mounted on the outer end of a shaft 57 disposed below and parallel with the shaft 53, the arrangement being such that by interchanging the pick-off gears 55 and 56 or by substituting another pair of gears of different ratio, the speed at which the spindle 34 is to be driven may be adjusted. The shaft 57 is provided at its inner end with a bevel gear 58 that meshes with a cooperating bevel gear 59 on a main driving shaft 60 extending from the front to the back of the machine transversely of the shafts 53 and 57.

The main driving shaft 60 may be connected by means of a friction clutch 61 directly with the shaft of a driving motor 62, which is shown connected by a flange mounting to the back of the bed 30. For stopping the shaft 60 when the clutch 61 is disengaged to disconnect it from the motor 62, there is provided a brake 63 which is arranged to be operated by actuating mechanism 64 that is primarily provided for actuating the clutch 61, and that includes a starting lever 65 at the front of the machine arranged to be moved in one direction to engage the clutch and in the other direction to engage the brake.

To provide for moving the work table 31 at feed rate, power is transmitted from the motor 62 through the clutch 61 to the main driving shaft 60 which is extended forward into an accessible feed rate-changing compartment 67 at the front of the machine. Removably mounted on the forward end of the extended shaft 60 is a pick-off gear 68 which meshes with a complementary pick-off gear 69 on the forward end of a shaft 70 disposed parallel to and above the main shaft 60. The pick-off gears 68 and 69 may be interchanged or another pair of similar pick-off gears having another ratio may be substituted therefor in well-known manner to adjust the rate of feeding movement of the table. From the feed rate changing pick-off gears, power is transmitted at the selected feed rate through the shaft 70 which is connected by a safety release clutch 71 with a co-axially disposed shaft 72 carrying a worm 73 that meshes with a worm wheel 74 constituting the feed rate driving element of the table driving rate changing transmission and reversing mechanism to which the present invention is particularly directed. Since the main driving shaft 60 is driven only when the main clutch 61 is engaged, the table 31 may be driven at feed rate only while the spindle 34 is operating.

In order that the table 31 may be driven at rapid traverse rate regardless of whether or not the spindle 34 is operating, an independent driving connection is provided directly from the shaft of the motor 62 by means of a train including a gear 76 mounted directly on the motor shaft and meshing with an idler gear 77 which in turn drives a gear 78 on a rapid traverse shaft 79 disposed generally parallel with the main driving shaft 60. The shaft 79 is connected by means of a safety release clutch 80 with a co-axially disposed shaft 81 which extends forward and is provided at its forward end with a bevel pinion 82 meshing with a bevel pinion 83 that is disposed co-axially with the feed rate driving worm wheel 74, and that constitutes the continuously operating rapid traverse rate driving element of the rate changing and reversing mechanism.

Referring to Fig. 2 of the drawings, the work-supporting table 31 is propelled longitudinally relative to the bed 30 by means of a feed screw 90 which is journaled at its ends in the ends of the bed 30, and which cooperates with a travelling nut 91 that is attached to the table. One end of the feed screw 90 is provided with a squared portion 92 for receiving a crank or the like, not shown, for turning the screw manually to position the table for setting up work or for hand feeding.

To protect the feed screw 90 from foreign substances, such as chips or cooling fluid, which might drop onto it, particularly when the table is moved to an extreme position exposing part of the feed screw, there is provided a guard 93, preferably of semi-circular shape as shown in Fig. 3, and that is disposed above and concentric with the screw 90. The guard 93 is secured at each end to the end of the bed 30 by attaching screws, as may be seen in Figs. 14, 21, and 26, in manner to protect the feed screw 90 throughout its entire length. As shown in Fig. 3, the travelling nut 91 completely encircles the feed screw 90 and is provided with lugs or ears 94 extending from each side thereof below its centerline and which are attached to the bottom of the table by means of screws 95, the nut being shaped to provide between its upper portion and the lower part of the table a segmental or semi-circular groove or channel 96 within which the guard member 93 may have relative longitudinal movement. By this arrangement, the driving screw 90 may be placed relatively high within the longitudinal groove in the bottom of the table forming the arcuate passageway 96, and the table screw may be completely protected from damage by foreign substances falling upon it.

For rotating the table screw 90 by power, a driving gear wheel 101 is keyed to the screw near the left end of the bed, as shown in Fig. 2. The screw driving gear 101 meshes with and is driven by a clutch gear 102, which is rotatably mounted on a stub shaft 103 fixed in the frame 30 parallel to and below the feed screw 90 and constituting part of the rate changing and reversing mechanism, the arrangement being such that the clutch gear 102 may be engaged by power driving means to drive the feed screw 90 in the one direction. For driving the feed screw 90 in the other direction, there is provided a clutch gear 104 which is rotatably mounted on a shaft 105 journaled in the bed 30 parallel to and below the fixed shaft 103, the clutch gear 104 being meshed with an idler gear 106, which in turn meshes with the clutch gear 102 as shown in Figs. 14 and 26. The table driving clutch gears 102 and 104 are mounted in fixed positions on the shafts 103 and 105 and each gear is provided on one face with clutch teeth or jaws 107 presented for engagement by cooperating teeth on a driving clutch member.

Power for moving the table 31 at feed rate is transmitted from the motor 62, as previously explained, through the main clutch 61, the main driving shaft 60, and the feed rate changer, to the worm 73 driving the cooperating worm wheel 74. As shown in Fig. 2, the worm wheel 74 is keyed to a shaft 108 that is journaled in the frame 30 co-axially with the shaft 105 and that is operatively connected thereto by means of an over-running clutch mechanism 109 in such manner that the shaft 105 may be driven at feed rate from the shaft 108 but is free to rotate at a faster rate by reason of the over-running clutch connection.

Slidably keyed on the shaft 105 for axial movement is a shiftable clutch gear 111 which meshes continuously with a similar clutch gear 112 slidably mounted on the stationary shaft 103, the two gears being arranged to rotate in opposite directions and at equal speeds. As shown, each of the slidably mounted clutch gears is provided on each face with clutch teeth or jaws 113, the gears being shown in neutral or central position in Fig. 2 with the clutch teeth 113 presented for selective engagement with cooperating clutch teeth at either side thereof.

To effect movement of the table 31 at feed rate to the right, for example, the slidably keyed clutch gear 111 on the shaft 105 is moved to the right to engage its teeth 113 with the teeth 107 of the table driving clutch gear 104, as shown in Fig. 6. For driving the table at feed rate to the left, the teeth of the clutch gear 111 are disengaged from the teeth of the clutch gear 104, and the oppositely rotating sliding clutch gear 112 on the shaft 103 is moved to the right to engage its teeth with the teeth of the table driving clutch gear 102, as shown in Fig. 7, thereby driving the feed screw in the reverse direction.

Power for moving the table 31 at rapid traverse rate is transmitted from the motor 62, as previously explained, independently of the main clutch 61 by the directly driven rapid traverse gear train and the shafts 79 and 81, to the bevel gear 82 that meshes with the bevel gear 83, which is rotatably mounted concentric with the worm wheel 74 and the shaft 105.

As shown in Fig. 2, the bevel gear 83 is keyed to an extending hub or sleeve of a rapid traverse clutch gear 114 that is rotatably mounted on the shaft 105 in position to cooperate with the sliding clutch gear 111. The clutch gear 114 meshes with and drives an oppositely rotating rapid traverse clutch gear 115 that is in turn rotatably mounted on the stationary shaft 103 in cooperating relationship with the sliding clutch gear 112. The rapid traverse clutch gears 114 and 115 are mounted in fixed positions on the shafts 103 and 105 and present clutch teeth 116 for engagement by the clutch teeth 113 of the slidably mounted clutch gears 111 and 112. The gears 114 and 115 rotate at equal speeds and in opposite directions at rapid traverse rate whenever the driving motor 62 is running.

When the table is being driven at feed rate to the left—for example, with the clutches in the position shown in Fig. 7 as previously explained—and it is desired to drive the table in the same direction at rapid traverse rate, it is merely necessary to move the slidable clutch gear 111 to the left to engage its clutch teeth 113 with the clutch teeth 116 of the rapid traverse clutch gear 114 as shown in Fig. 8, whereupon the engaged clutch gears and the table driving mechanism will rotate at rapid traverse rate, the shaft 105 being free to turn at the faster rate by reason of the overrunning clutch 109.

Because of the over-running clutch driving connection in the feed rate drive to the table 31, the transition in driving rate from feed to rapid traverse or from rapid traverse to feed may be effected without stopping movement of the table 31. Thus to change from rapid traverse drive to the left back to feed to the left, it is merely necessary to disengage the sliding clutch 111 from the rapid traverse clutch 114, whereupon the feed rate driving connection is immediately re-established by the over-running clutch 109.

To operate the table 31 at rapid traverse rate to the right, the sliding clutch gear 111 is moved to engage the table driving clutch gear 104 in manner to drive the table to the right at feed rate, and then the sliding clutch gear 112 is moved to the left to engage the rapid traverse clutch gear 115 to change the rate to rapid traverse, the clutches then being in the position shown in Fig. 5. Although positive clutches of the jaw type are shown in the drawings, it is to be understood that any other suitable clutches such as friction clutches may be utilized in their stead.

The mechanism for shifting the slidable clutch gears 111 and 112 is shown in Fig. 4 and comprises shifting forks 118 and 119, which engage the respective clutch gears and are carried on shifting rods 120 and 121 respectively, that are slidably mounted in the bed 30. The rods 120 and 121 are provided with shifting arms 122 and 123 respectively, which carry at their lower ends cam followers 124 and 125 respectively for engaging a cam-shifting mechanism by means of which movement of the clutches is controlled. To avoid jamming of the shifting mechanism, the shifting forks 118 and 119 are connected to the shifting rods 120 and 121 by springs 126 in such manner that should the cooperating teeth of a pair of the clutches fail to intermesh when the shifting mechanism is actuated, the springs 126 will permit the associated shifting rod to move relative to the shifting fork, and will exert a continuous resilient pressure to effect engagement as soon as the gearing is turned to bring the teeth into meshing relationship.

In Fig. 5, the clutch shifting mechanism of Fig.

4 is shown disposed in operating position relative to the shiftable clutch mechanism, and the cam mechanism for effecting the shifting in predetermined sequence is indicated diagrammatically. As shown, the shifting mechanism includes a cam plate 130 having cam grooves 131 and 132 which engage respectively with the cam followers 124 and 125 of the shifting arms 122 and 123, the arrangement being such that when the cam plate 130 is turned about its axis, the cam grooves 131 and 132 will cause the clutches to be shifted in predetermined sequence and will prevent engagement of the clutches in any combination which would lock the mechanism or might result in damage thereto.

For shifting the clutches manually, there is provided a shifting lever 135 mounted on the front of the machine and directly connected to the cam plate 130 for turning it about its axis. As indicated in Fig. 5, the lever 135 may be moved to any one of five positions, a detent mechanism including a spring-pressed plunger 136 disposed to engage any one of five notches 137 in the plate 130, being provided to retain the lever in any selected one of its positions.

With the lever in the position A shown in full lines in Fig. 5, the shiftable clutches 111 and 112 are positioned in engagement with the clutches 104 and 115 respectively to effect movement of the table 31 to the right at rapid traverse rate as previously described. When the lever is moved to position B, the clutch 112 is moved out of engagement with the rapid traverse clutch 115 to the neutral position as shown in Fig. 6, and the table will then be driven at feed rate to the right by means of the clutch 111. Upon shifting the lever to the neutral position C, the clutch 111 is moved out of engagement with the table driving clutch 104, thus placing both shiftable clutches in the neutral position as shown in Fig. 2, thereby stopping the table. Upon moving the lever to position D, the clutch 112 is moved into engagement with the table driving clutch gear 102, as shown in Fig. 7, to drive the table to the left at feed rate. Shifting the lever to position E moves the clutch gear 111 into engagement with the rapid traverse clutch 114, as shown in Fig. 8, to drive the table at rapid traverse rate to the left. It will be noted that in moving the lever 135 from any one of its positions to an adjacent position, only one of the movable clutch elements is engaged with or disengaged from a cooperating clutch element.

For automatically effecting change in the rate of movement of the table, or for stopping the table automatically at a predetermined position, suitable trip dogs may be mounted at predetermined positions in a T slot 140 in the forward edge of the table 31 for cooperating with a pair of tripping posts 141 and 142 mounted for vertical endwise movement in the bed 30 as shown in Fig. 5. The trip posts 141 and 142 are operatively connected at their lower ends to the cam plate 130 at opposite sides of its center in such manner that the cam plate may be turned by vertical movement of either one of the posts. Two trip posts are provided in order that one of the posts may be acted upon by cooperating trip dogs when the table is moving in one direction and the other post may be effective when the table is moving in the other direction. To this end the trip post 141 is provided at its top with a forwardly projecting lifting lug 143 and the post 142 is provided with a similar but rearwardly projecting lifting lug 144, the arrangement being such that the cooperating trip dogs on the table operate in different planes for effecting control in each direction. As shown in Fig. 5, with the control lever 135 positioned to move the table 31 to the right the trip post 141 is elevated into position to present the lug 143 for engagement by its cooperating trip dogs in the forward plane while the trip post 142 is depressed below the line of action of its cooperating dogs.

When the machine is operating automatically, the trip dogs in the forward plane, for instance, may act upon the trip post 141 while the table is moving to the right to change the rate of travel from rapid traverse to feed or vice versa, or to stop the table by moving the post down to neutral position. However, after the table has been stopped by moving the trip post and the shiftable clutches to neutral position, it is apparent that further movement of the clutch shifting mechanism must be accomplished by means not dependent upon movement of the table. Consequently in order to effect reversal of the direction of movement of the table 31 automatically, auxiliary power reversing means must be provided to move the cam shifting mechanism through the neutral position to a position effecting movement in the other direction.

According to this invention, auxiliary power reversing means are provided responsive in action to movement of reversing trip rods 145 and 146 that are mounted for vertical movement at the left and right respectively of the trip posts 141 and 142, and that are disposed to be engaged by reversing dogs 147 and 148 respectively, carried by the table as shown in Fig. 5, to effect automatic reversal of the table when operating in either direction. The auxiliary power reversing mechanism may be actuated by mechanical means, by electrical means, or by hydraulic means. Fig. 9 shows the front of the machine provided with a control panel associated with mechanically actuated reversing means; Fig. 10 shows a control panel associated with electrically actuated reversing means; and Fig. 11 illustrates a control panel associated with hydraulically actuated reversing mechanism.

Referring now to Fig. 12 of the drawings, the power reversing mechanism there illustrated exemplifies a reverser actuated by auxiliary power derived from the mechanical drive train, and comprises essentially a spring urged reversing plunger or ram 150 slidably mounted for vertical movement in the frame of the machine in manner to be forced downward by a spring 151 to move the clutch shifting mechanism through the neutral position in response to movement of one of two reversing trip rods 145a or 146a by the cooperating reversing dog 147 or 148. The reversing plunger 150 is normally retained in its upper position with the spring 151 compressed, by means of a latch 152 that engages a shoulder 153 on the plunger 150, as best shown in Fig. 14.

The latch 152 is fixed on a horizontal shaft 154, as shown in Fig. 15, that carries tripping arms 155 and 156 respectively, slidably keyed thereon in position to engage slots in the reverse tripping rods 145a and 146a respectively. When one of the trip rods is depressed to initiate a reversing action—for example, the reversing trip rod 145a—the cooperating tripping arm 155 is moved down to turn the shaft 154 clockwise as seen in Fig. 14, thereby withdrawing the latch 152 from engagement with the shoulder 153 and permitting the spring 151 to force the plunger 150 downward in the manner shown in Fig. 19. As shown in Figs. 12, 17, 18, and 19, the lower end of the plunger 150 is pointed to present sloping faces, one of which engages one side of a detent 158 which is associated with a clutch shifting cam plate 130a corresponding to the cam plate 130 of Fig. 5, in manner to turn the detent and the cam plate to the position shown in Fig. 19 to effect shifting of the clutches for reversing the direction of movement of the table.

At the termination of the downward movement of the plunger 150, the shoulder 153 thereof engages an abutment 160 of a power engaging control rod 161 which constitutes a stop for the plunger to limit its movement to a predetermined position and also constitutes part of a shifting device for engaging a power operated mechanism for returning the plunger to its initial raised position. As shown in Figs. 12 and 15, the control rod 161 is provided near its upper end with a slot 162 which engages one end of a bell crank 163 in manner to turn the bell crank clockwise, as shown in Fig. 19, when the shoulder 153 of the plunger 150 engages the abutment 160. The other arm of the bell crank 163 engages a clutch spool 164 and forces its teeth into engagement with complementary teeth on a clutch gear 165. As shown in Fig. 2, the clutch gear 165 meshes with a gear 166 on the end of a jack shaft 167, which carries another gear 168 that meshes with the constantly rotating rapid traverse clutch gear 114, whereby the shaft 167 and associated gearing are constantly driven at uniform speed.

When the clutch 164 is engaged with the clutch gear 165, a shaft 170 on which the clutch 164 is slidably keyed is coupled to the clutch gear 165 and is caused to rotate therewith. As shown in Figs. 14 and 15, the shaft 170 is provided with a segmental pinion 171 that engages rack teeth 172 on the back side of the plunger 150, and rotation of the shaft 170 through engagement of the clutch 164 causes the pinion 171 to turn in direction to lift the plunger 150 upward to its latched position. When the shoulder 153 of the plunger 150 is moved up past the latch 152, it engages an abutment 173 on the control rod 161 and moves the rod upward in manner to turn the bell crank 163 counter-clockwise and to disengage the clutch 164, whereupon rotation of the shaft 170 ceases, the plunger 150 being retained in its raised position by the latch 152 ready for a subsequent reversing action.

To insure that the pointed plunger 150 will engage the proper face of the detent 158 to effect reversal, the detent is arranged to be moved relative to the cam plate 130a through a limited angle, and means are provided for causing the actuating reversing trip rod to swing the detent 154 to the proper side of the plunger 150 prior to tripping the plunger. As shown in Fig. 12, a lower extension of the detent 158 is provided with an arcuate slot 175 which receives a pin 176 secured to the cam plate 130a constituting a lost-motion connection between the detent and the cam plate. A rack bar 178 is provided for moving the detent 158 relative to the cam plate, the bar being slidably mounted in a horizontal position and having rack teeth 179 disposed to engage gear teeth 180 on the hub of the detent 158. The ends of the rack bar 178 are chamfered to present slanting surfaces 181 disposed to cooperate with complementary slanting surfaces 182 on the lower ends of the reversing trip rods 145a and 146a.

As best shown in Fig. 18, when one of the reversing trip rods—for instance, the trip rod 145a—is moved downward by a reversing dog, the slanting surface 182 at its lower end engages the slanting surface 181 of the rack bar 178, forcing it inwardly to the right to cause the detent 158 to turn to the left relative to the cam plate 130a to the position shown in Fig. 18 for receiving the descending reversing plunger 150 in manner to effect reversal to the left. The rack bar 178 is provided in its lower surface near its ends with detent notches 183 which are engaged by spring-pressed ball detents 184 that tend to move the rack bar to central position. Each of the reversing trip rods 145a and 146a is provided with a spring 185a as shown on rod 146a in Fig. 12, to return it to raised position after being depressed by a reversing dog.

The abutment 160 on the control rod 161 is positioned to engage the shoulder 153 of the reversing plunger 150 when the cam plate 130a has been turned by the detent 158 to a position resulting in reversal of the table at rapid traverse rate, as shown in Fig. 12. If it is desired to effect reversal of the table at feed rate, the control rod 161 may be turned about its axis to present an abutment 187 for engagement by the shoulder 153, as shown in Figs. 17, 18, and 19, to stop the downward movement of the plunger 150 at a point at which the cam plate 130a has been turned only sufficiently to shift the clutches to effect reversal at feed rate. For turning the control rod 161 to control the rate at which reversal occurs, there is provided a slidably mounted control bar 188, best shown in Fig. 13, having rack teeth 190 meshing with elongated gear teeth 191 on the lower end of the rod 161. The bar 188 extends horizontally through the forward wall or control panel of the machine and is provided at its outer end with an operating knob 192, as shown in Figs. 9, 13, and 14. A detent mechanism 193, Fig. 14, is provided to position the rate selecting bar 188 in either its inner or its outer position for effecting reversal either at rapid traverse rate or at feed rate respectively.

Referring particularly to Fig. 5, the table 31 is there shown provided with trip dogs arranged to effect an automatic or continuous cycle of operation including intermittent or skip milling and automatic reversal at rapid traverse rate. Upon the operator's moving the lever 135 to the position "A" as shown in full lines, the work table 31 is driven to the right at rapid traverse rate to move a workpiece into position for engagement by a cutter in the spindle 34. When the workpiece arrives at the cutter, a feed dog 195 secured in the T slot 140 engages the tripping post 141 and moves it down, turning the cam plate 130 and the lever 135 to position "B" to change the rate of movement from rapid traverse to feed.

After the first workpiece has been fed past the cutter, a rapid traverse lifting dog 196 engages the lower side of the forwardly projecting lug 143 of the trip post 141, and raises the trip post back to rapid traverse position for quickly advancing the table to bring a second workpiece into position beneath the cutter. A second feed dog 197 then forces the trip post 141 down to feed position and feeding movement of the table continues until the second workpiece has been fed past the cutter.

Referring now to Figs. 17, 18, and 19, showing the mechanical reversing mechanism, Fig. 17 shows the feed dog 197 passing over the trip post 141a during the final cut. At the end of the table stroke to the right, a stop dog 198 engages the trip post 141a, forcing it downward positively, as shown in Fig. 18, to partially disengage the feed driving clutch regardless of the driving load on the clutch teeth. At the same time, the reversing dog 147 engages the reversing trip rod 145a, forcing it down to turn the reversing detent 158 to the left for positioning it for engagement by the plunger 150, as previously explained. After the stop dog 198 has moved the trip plunger 141a far enough to partially disengage the teeth of the clutch operating under the feeding load, but not far enough to completely disengage the driving clutch, the reversing dog 147 causes the trip rod 145a to unlatch the reversing plunger 150 which then descends upon the detent 158, as shown in Fig. 19. Since the clutch teeth have by this time been forced nearly to disengaged position, only moderate force is needed to complete the disengaging movement of the driving clutch and to move the cam actuating mechanism through the neutral position to promptly engage the clutch required for driving the table in the reverse direction at feed rate, the rate selecting control rod 161 being shown in Fig. 19 in position to effect reversal at feed rate.

As the trip dogs are arranged in Fig. 5, it is preferable to effect reversal at rapid traverse rate and movement of the table to the left continues at rapid traverse rate until a feed dog 199 engages the trip post 142 to move it down to feed position. The table may then be moved alternately at feed rate and rapid traverse rate through a cycle similar to that effected by the trip dogs 195, 196, and 197 until the end of the stroke in the other direction is reached, at which time a stop dog 200 engages the tripping post 142 and the reverse dog 148 engages the reversing rod 146 to again reverse the direction of movement of the table causing it to move to the right at rapid traverse rate as before explained. It is to be noted that the cam actuated clutch shifting mechanism invariably shifts the clutches through neutral position into feed position before shifting into rapid traverse position, thereby avoiding shock to the drive mechanism.

If desired, the automatic reversing mechanism may be disengaged and the table caused to stop at either end of its stroke selectively. As shown in Fig. 15, the tripping arms 155 and 156 are slidably keyed on the shaft 154 in such manner that they may be moved out of engagement with the cooperating notches in the reversing trip rods 145a and 146a respectively to render either or both of the reversing trip rods ineffective. For controlling the positions of the tripping arms 155 and 156, there are provided control levers 202 and 203 respectively which are journaled in the front of the machine, as shown in Figs. 9, 14, and 15, and are provided at their inner ends with eccentrically disposed actuating pins 204 and 205 engaging cooperating slots in the tripping arms 155 and 156 respectively, the arrangement being such that the arms may be moved from engaged position shown in Figs. 12, 18, and 19, to disengaged position shown in Fig. 17 or vice versa, by turning the respective control cranks through one-half revolution. Each of the control cranks is provided with a spring-pressed positioning plunger 206 disposed to engage either one of two positioning holes 207 or 208 to lock the shifting arms in either the engaged or disengaged position. In the arrangement shown, when the positioning plungers 206 are engaged with the inner positioning holes 208, the tripping arms 155 and 156 engage the tripping rods 145a and 146a respectively to provide for reversal at both ends of the table stroke. When one crank, for instance the crank 203, is turned, as shown in Fig. 15, to engage its plunger 206 with the outer positioning hole 207, the corresponding tripping arm 156 is disengaged from the tripping rod 146a and consequently the table will not reverse when the rod 146a is depressed by the reversing dog 148. However, inasmuch as a stop dog such as the dog 200 is always used in conjunction with a reversing dog, as shown in Fig. 5, the stop dog will depress the direct acting tripping post 142 and disengage the clutch to stop the table.

According to another embodiment, constituting a modification of the invention, the automatic reversing movement is accomplished electrically by means of a reversible electric motor apparatus arranged to provide the auxiliary power necessary to move the clutch shifting mechanism through the neutral position. The particular electric reversing motor illustrated in Figs. 20, 21, and 22 of the drawings comprises essentially two solenoids 211 and 212 respectively, that are arranged to rotate a clutch shifting cam plate 130b in one direction or in the other direction under the control of switches actuated by the reversing dogs on the table. As shown, the solenoids are provided respectively with armatures 213 and 214 which are connected respectively to the ends of a bar 215 of non-magnetic material that it attached to a rack element 216 having rack teeth engaging gear teeth on the lower edge of the cam plate 130b, corresponding to the cam plate 130 shown diagrammatically in Fig. 5.

For controlling the solenoids 211 and 212, there are provided a pair of reversing trip rods 145b and 146b which are associated with control switches 217 and 218 respectively, the switches being of the quick acting or toggle type, as illustrated by the switch 218 in Fig. 20, to provide for closing the circuit to the cooperating solenoid without delay when the table arrives at the predetermined position at which reversal is to take place.

Referring to the schematic wiring diagram, Fig. 22, power for actuating the electrical reversing motor is derived from a power line conductor 220 which may represent one side of the power line that supplies energy to the driving motor 62, or any other suitable source of energy, and flows through a conductor 221, a disconnecting switch 222, and a conductor 223, to the reversing switch 217. When the reversing trip rod 145b is depressed by the reversing dog 147, the switch 217 is closed and the current flows through a conductor 224, a switch 225, and a conductor 226, to the winding of the solenoid 212, and thence through a conductor 227 to a line conductor 228, constituting the other side of the main power line. With the winding of the solenoid 212 thus energized, the armature 214 is drawn into the solenoid, moving to the right as shown in Figs. 20 and 22 to turn the cam plate 130b in manner to shift the clutches for reversing the direction of movement of the table 31 from movement to the right to movement to the left.

Upon the moving of the armature 214 to the right in its stroke within the solenoid 212, it engages a plunger 229 which opens the switch 225, thereby breaking the circuit and de-energizing the solenoid. As may be seen in Fig. 20, the switch 225 is also of the quick break or toggle type, similar to the switch 218. This de-energizing switch 225 is provided to prevent continued flow of current through the solenoid in the event that the switch 217 is held closed for an undue length of time, as might be the case if reversal should occur at a slow feed rate requiring an appreciable period of time to withdraw the reversing dog 147 from the trip rod 145b sufficiently to permit the rod to be returned to its initial position by a spring 185b and to open the switch 217. As in the case of the mechanically actuated reversing mechanism, a stop dog 198 is used in conjunction with the reversing dog 147 to partially disengage the driving clutch prior to closing the reversing switch and also to act as a safety element operative to stop the table should the reversing mechanism fail to function.

A similar circuit is provided for effecting reverse in the other direction in response to engagement of the reverse trip rod 146b by the reverse dog 148. As shown in Fig. 22, when the rod 146b is depressed, current may flow from the line conductor 220 through a conductor 231, a disconnecting switch 232 and a conductor 233 to the reversing switch 218, from which it flows through a conductor 234, a de-energizing switch 235, and a conductor 236, to the winding of the solenoid 211, and thence by a conductor 237 to the other line conductor 228. Upon energizing the solenoid 211, the armature 213 is moved to the left, reversing the direction of table movement and opening the de-energizing switch 235.

In order that the mechanism may be adjusted to effect reversal at either rapid traverse rate or feed rate, the solenoids 211 and 212 together with their respective de-energizing switches 235 and 225, are each so mounted in the machine frame that they may be moved as a unit longitudinally relative to their cooperating armatures 213 and 214. As may be seen in Figs. 20 and 21, the solenoids 211 and 212 are carried by movable brackets or sub-frames 241 and 242 respectively, each of which is slidably mounted upon a pair of bars 243 fixed in the machine frame. To provide for adjusting the position of the solenoids, the supporting brackets are associated with adjusting cranks 244 and 245 respectively, journaled in the front of the machine frame, as shown in Figs. 10, 20, and 21, and each having an eccentrically disposed pin engaging a cooperating slot in the bracket in such manner that a half turn of the crank will move the bracket and its associated solenoid from one of its operating positions to the other position.

Each of the cranks 244 and 245 is provided with a positioning plunger 246 that is disposed to engage either one of two positioning holes 247 and 248 in the front of the machine, as shown in Figs. 10 and 20. When the positioning pin 246 of a crank is engaged with the inner positioning hole 248, the associated solenoid is moved inwardly to the position taken by the solenoid 212 in Fig. 20. Upon energizing the solenoid 212 in the position shown in Fig. 20, its cooperating armature 214 is moved to the right, engaging the switch actuating plunger 229 and forcing it inwardly against a spring 251 until the armature comes to rest at the position within the solenoid at which the magnetic forces acting upon it are neutralized.

With the crank 245 and the bracket 242 in the position shown, the armature 214 is stopped by neutralizing action within the solenoid at the point at which the cam disc 130b has been turned to position to effect reversal of the direction of table movement at feed rate. However, the armature 214 is free to be moved farther within the solenoid 212 if the cam plate 130b is shifted to rapid traverse position by a rapid traverse trip dog or by the manually actuated lever 135. To effect reversal at rapid traverse rate, the positioning plunger 246 of the appropriate crank 244 or 245 is withdrawn from the inner positioning hole 248 and the crank turned to engage it with the outer positioning hole 247, thereby moving the bracket 242 and the solenoid 212 to the right. If the solenoid is now energized, the armature 214 is moved to the right a further distance before arriving at its neutralized position and consequently the cam plate 130b is turned through the feed position to the rapid traverse position.

As shown, the de-energizing switches 225 and 235 are carried by the brackets 242 and 241 respectively, and are each indirectly actuated from the plunger 229 by a switch plunger 253 having a tapered end which engages a tapered portion of the plunger 229, the arrangement being such that the plunger 229 may be moved by the armature a distance greater than that necessary to actuate the switch, without injury resulting to the switch.

If it is desired to disconnect either reversing solenoid to render it inoperative, the respective disconnecting switches 222 or 232 may be opened to break the circuit, whereupon the reversing dog will become ineffective and the associated stop dog will function to stop the table at the end of the stroke. As shown in Fig. 10, these switches may take the form of push-button switches mounted on the front of the control panel of the machine. Although the electric reversing motor is shown as constituted by solenoids and cooperating armatures, it is to be understood that any other suitable electric motor may be substituted.

In accordance with another modification of the invention, automatic reversing may be accomplished by hydraulically actuated mechanism utilizing fluid pressure as the source of auxiliary power for moving the shifting mechanism through the neutral position. Referring particularly to Figs. 24 and 25, the hydraulic reversing mechanism comprises essentially a pair of oppositely acting hydraulic cylinders 261 and 262 provided with cooperating pistons 263 and 264 respectively, which are mounted on the opposite ends of a rack bar 265. The rack bar is provided with rack teeth 266, which mesh with gear teeth 267 on a cam plate 130c in manner to turn the cam plate to actuate the clutch shifting mechanism.

Admission of fluid pressure to the cylinders 261 and 262 is controlled by a control valve 268 mounted at the front of the machine in position to be actuated by reversing trip rods 145c and 146c. As shown in Figs. 23 and 24, the trip rods act upon the respective arms of a lever 270 which is pivoted midway between the rods for rocking movement in response to downward movement of either trip rod by a cooperating reversing dog. The lever 270 is provided on its left arm with an extending branch 271, the end of which engages a piston or plunger 269 of the control valve 268 for moving it vertically within a stationary valve casing 272.

Referring to the control circuit diagram shown in Fig. 28, fluid pressure for operating the hydraulic reversing mechanism is derived from a suitable pump 275, which may be the pump utilized for providing lubricating oil under pressure to the working parts of the machine. With the piston 269 of the valve 268 in the central or neutral position, as shown in Figs. 24 and 27, oil under pressure from the pump 275 flows through a conduit 276 into a conduit 277 which communicates with a port 278 in the valve casing 272. The valve piston 269 being in neutral position, the port 278 communicates with a groove 279 in the valve piston, as shown in Fig. 27, which in turn communicates with a port 280 connected by a conduit 281 to a low pressure relief valve 282. From the relief valve, the fluid escapes to atmosphere or to a lubricating system through a conduit 283.

When one of the reversing trip rods—for example, the rod 145c—is depressed by a reversing dog to effect automatic reversal, as shown in Fig. 28, the valve piston 269 is moved to a position closing the passageway to the low pressure relief valve, whereupon the pressure of the oil in the conduits 276 and 277 is raised to a point at which it will flow through a conduit 285 into a high pressure relief valve 286, from which it escapes through a conduit 287 into the low pressure relief valve 282 and thence to the conduit 283.

With the valve piston 269 in the position shown in Fig. 28, the oil under high pressure in the line 276 flows through a conduit 288 to a port 289 which communicates with a groove 290 in the valve piston that is connected to a longitudinal passageway 291 extending through the piston and communicating with a cylinder or chamber 292 at the top of the valve casing 272. Oil under pressure in the cylinder 292 acts upon a piston head 293 on the valve piston 269 and forces it downward to quickly complete movement of the valve to a reversing position. With the valve piston in the reversing position as shown, the high pressure oil flows from the valve port 289 into a groove 294 of the valve piston and thence through a port 295 into a conduit 296 constituting a part of a passageway leading to the reversing cylinder 261. The conduit 296 leads to a port 297 of a disconnecting valve 298 having a piston 299 provided with a groove 300 through which the oil flows to a port 301 and into a conduit 302. The conduit 302 extends to the left reversing cylinder 261 and the oil under pressure therein exerts force on the reversing piston 263, moving it to the right to turn the cam plate 130c counter-clockwise for shifting the clutches to reverse the direction of table movement.

From the conduit 302, a branch conduit 303 leads to an auxiliary cylinder 304 having a cooperating piston 305 of larger effective area than the reversing piston 263 and which is provided with a piston rod or stop plunger 306 projecting into the reversing cylinder 262. The plunger 306 constitutes a stop member for the reversing piston 264 when the auxiliary piston 305 is forced to the left by pressure exerted by the oil flowing into the cylinder 304 through the conduit 303, the total pressure on the auxiliary piston 305 being greater than that exerted upon the smaller reversing piston 263. With the stop plunger 306 in the position shown, the piston 264 engages it, stopping the movement of the piston 263 to the right at a point at which the shiftable clutches are so positioned that reverse movement will take place at feed rate.

After the piston 263 has been moved to the position effecting reversal at feed rate, the oil under pressure in the reversing cylinder 261 flows through a port 308 that has been uncovered by the piston, into a conduit 309 leading to a valve port 310, and thence through a groove 311 in a rate selecting valve rod 312 into a port 313 connected with a return conduit 314. The conduit 314 leads to a spring-pressed equalizing valve 315 which is opened, after the piston 263 has been firmly forced into reversing position, by the pressure of the oil flowing through the port 308 and through the return conduit. When the equalizing valve 315 is moved by pressure in the conduit 314 to its open position, a conduit 316 leading from the cylinder 292 in the upper end of the valve casing 272 is placed in communication with a conduit 317 which leads to a similar cylinder 318 at the lower end of the valve casing 272, whereupon the pressures acting on the ends of the valve piston 269 are equalized and the valve is returned to its central or off position by the action of a spring 185c, Fig. 24, that raises the depressed reversing rod 145c to its upper or neutral position.

After the control valve piston 269 returns to its neutral position, the oil under pressure within the reversing cylinder 261 and in the auxiliary cylinder 304 is free to escape by returning through the conduits 303 and 302, the valve 298, the conduit 296, and the valve port 295, into the valve groove 294, which then communicates with a port 320 from which the oil may escape to atmosphere through a conduit 321. Likewise, oil under pressure in the return conduit 314 is free to escape through a conduit 323 leading to a port 324 in the valve casing 272 which then communicates through a groove 325 with a port 326, from which it escapes to atmosphere through a conduit 327. Further, the groove 279 of the valve piston 269 is positioned to re-establish communication between the ports 278 and 280 to permit the oil at high pressure in the conduit 276 leading from the pump to escape through the conduits 277 and 281 to the low pressure relief valve 282, thereby reducing the pressure in the system to that required for lubrication purposes only and relieving the pump 275 of excessive duty.

When the reversing action takes place in the other direction, as when the rod 146c is depressed to reverse the table from movement toward the left to movement toward the right, the lever 270 is pivoted clockwise to raise the control valve piston 269 within its casing 272. This results in closing the port 278 as before to prevent escape of oil through the low pressure relief valve 282, thereby building up a high pressure in the conduit 276 leading from the pump 275, as previously explained. The upward movement of the valve piston 269 also places a groove 330 therein in communication with the pressure port 289 to admit pressure fluid into a passageway 331 extending longitudinally of the valve piston to the chamber or cylinder 318 at the bottom of the valve casing wherein pressure is exerted against a piston head 332 on the valve piston to quickly move it upward to reverse position. This places a valve groove 333 in communication with the pressure port 289 and with a port 334 communicating with a conduit 335 which leads to a disconnecting valve 336 similar to the previously described disconnecting valve 298.

Assuming the disconnecting valve 336 to be in raised position corresponding to the position in which valve 298 is shown, oil from the conduit 335 enters through a port 337 and passes along a groove 338 in a plunger 339 to a port 340 which communicates with a conduit 341. The conduit 341 is connected to the right reversing cylinder 262 by a branch conduit 342 for forcing the piston 264 to the left in effecting reversing movement. The conduit 341 is also connected with an auxiliary cylinder 343 having a piston 344 of larger effective area than the reversing piston 264 connected to a stop rod 345 for limiting the movement of the reversing pistons when it is desired to reverse at feed rate to the right, as previously explained in connection with the auxiliary limiting piston rod 306.

As it is shown in Fig. 28, the apparatus is adjusted to effect reversal to the right at rapid traverse rate. Consequently, when the reversing rod 146c is depressed to effect reversal, the reversing piston 264 is moved to the left to its extreme position, after which the oil under pressure flows from the cylinder 262 through a port 348 uncovered by the piston. From the port 348, the oil flows through a groove 349 in a rate selecting valve 350, into a port 351 and a channel 352 leading to the return conduit 314, through which it flows to actuate the equalizing valve 315 for equalizing the pressure on the ends of the valve plunger 269 to return it to neutral position as previously explained. When the valve plunger 269 returns to neutral position, pressure in the reversing cylinder 262 is relieved through the conduit 342, the conduit 341, and the conduit 335 by reason of the fact that the port 334 in the valve casing 272 then communicates through the groove 333 with the port 326, from which the oil escapes to atmosphere through the conduit 327.

With the valve plunger 269 in neutral position, the other reversing cylinder 261 is connected, as previously explained, by means of conduits 302 and 296, and ports 295 and 320 to the conduit 321 which is open to atmosphere; consequently the reversing pistons 263 and 264 are both free to move within their respective cylinders to permit the cam plate 130c to be turned manually or by means of the dog operated tripping posts 141c and 142c.

To adjust the reversing mechanism to provide for reversing at feed rate or at rapid traverse rate, there is provided a pair of rate selecting cranks 355 and 356 which are journaled in the front of the machine, as shown in Fig. 11, and are connected respectively with the rate selecting valves 312 and 350 by means of eccentric pins 357 and 358 operating in slots in the valves, as shown in Figs. 25 and 28. Each of the rate selecting valves 312 and 350 respectively has secured to its end a movable abutment member 360 and 361 respectively, which cooperate with piston rods 362 and 363 associated with the auxiliary pistons 305 and 344 respectively to control movement of the stop plungers 306 and 345.

As shown, the piston rods 362 and 363 are provided at their outer ends with collars 364 and 365 respectively arranged to engage the abutment members 360 and 361. When one of the control cranks, for instance the crank 356, is turned to rapid traverse position, as shown in Fig. 28, its associated valve rod 350 is moved to the left to bring the abutment member 361 into contact with the collar 365 in such manner that movement of the auxiliary piston 344 to the right by fluid pressure in the cylinder 343 is prevented. With the piston 344 and its associated stop rod 345 held in the left position, the reversing pistons 263 and 264 are free to move to the left through a full stroke under the influence of pressure in the reversing cylinder 262, thereby turning the cam plate 130c to cause reversal to occur at rapid traverse rate.

With the valve rod 350 in the left position, as shown in Fig. 28, the valve groove 349 is moved out of register with a feed rate port 366 of the cylinder 262, which corresponds with the port 308 in the cylinder 261, to prevent the pressure fluid within the cylinder 262 from escaping until after the piston 264 moves through a complete stroke to effect reverse at rapid traverse rate. When the piston 264 arrives at the end of its full stroke, it uncovers the port 348, as before explained, to establish communication through the valve groove 349 to the port 351 and thence through the channel 352 to the return conduit 314. With the control valve rod 350 in right hand position for reversing at feed rate, the valve groove 349 registers with the feed rate port 366.

If it is desired to render the automatic reversing mechanism inactive at either end of the table stroke, the corresponding disconnecting valve 298 or 336 may be actuated by an associated control handle 367 or 368, shown in Figs. 11, 23 and 28, to move it to the disconnecting position in which the valve 336 is shown in Fig. 28. With the reversing mechanism rendered inactive, the stop dog associated with the corresponding reversing dog functions to stop the table at the end of its stroke, as previously explained.

With the disconnecting valve 336 in the disconnecting position as shown, pressure fluid passing from the control valve 269 through the conduit 335 enters the port 337 of the disconnecting valve and passes through the valve groove 338 to a port 371 leading to a conduit 372 which connects with the conduit 316 leading to the chamber 292 at the upper end of the control valve casing 272. By this connection, pressure is established on the piston 293 at the top of the valve plunger 269 to counteract the pressure on the piston 332 at the lower end of the valve, which tends to hold the valve in the reverse position.

With the pressures at the ends of the valve plunger 269 equalized in this manner, the valve is free to return to its neutral position as soon as the table is moved to withdraw the reversing dog from the reversing rod 146c. In the disconnecting valve 336, a land 375 prevents the flow of pressure fluid from the conduit 335 and the port 337 to the port 340 and the conduit 341 leading to the reversing cylinder 262, and prevents reversal at the left end of the table stroke. A groove 376 in the disconnecting valve plunger 339 connects the port 340 with a port 377 whereby liquid in the reversing cylinder 262 may escape through the conduit 342, the conduit 341, and the ports 340 and 377 to a conduit 378 which is open to the atmosphere. By thus relieving the pressure in the reversing cylinder 262, the clutch actuating cam mechanism is freed to be moved manually by the control lever 135 to start the table in the reverse direction at either feed rate or rapid traverse rate.

In similar manner, the disconnecting valve 298 may be positioned by the control handle 367 to render the reversing mechanism inactive at the right end of the table stroke. With both the disconnecting valves 298 and 336 in disconnecting position, all danger of accidental reversal of the table by inadvertent actuation of the control valve plunger 269 is obviated.

From the foregoing descriptions and explanations of the operation of the several embodiments of this invention, it is evident that the invention has provided an improved transmission mechanism and automatic reversing control apparatus for a machine tool which may be adjusted readily to effect any one of several modes of operation, and that is at all times under the direct and positive control of the machine operator.

Although only three specific embodiments of the invention have been shown as illustrative of preferred apparatus operative in accordance with this invention, various other modifications may be devised by skilled mechanics in utilizing the principles herein set forth, without departing from the spirit and scope of the invention as defined in the subjoined claims.

I claim:

1. In a rate changing and reversing mechanism for a machine tool having a base and a reciprocatory work table carried by said base, the combination with a source of power, of a pair of clutch elements connected to be driven by said source of power in opposite directions of rotation at rapid traverse rate, a driving mechanism for said work table including a pair of table driving clutch elements respectively opposing and spaced from said rapid traverse clutch elements, a pair of continuously intermeshing gears each having clutch elements on both faces, said gears being slidably mounted between said opposing clutch elements respectively in such manner that each may be moved into engagement with either the one or the other of said opposing clutch elements, means including an over-running clutch operatively connecting said gears to said source of power in manner to drive them at feed rate, and means for shifting said slidable gears to engage or to disengage said clutch elements, whereby said table may be driven in either direction depending upon which one of said gears is clutched to its cooperating table driving clutch element and either at rapid traverse rate or at feed rate depending upon whether or not the one of said gears not clutched to the table driving clutch element is clutched to its cooperating rapid traverse clutch element.

2. In a rate changing mechanism for a machine tool, two clutch elements disposed to rotate in opposite directions and to be driven at a predetermined rate, complementary second clutch elements disposed to be engaged selectively with said first clutch elements respectively and operatively connected to rotate in opposite directions, independent means operatively connected to rotate said second clutch elements at another rate when neither of them is engaged with its complementary first clutch element, a driven member, and means to engage said driven member selectively with either of said second clutch elements, whereby said driven member may be rotated in either direction at either rate upon suitably engaging said clutch elements.

3. In a rate changing and reversing mechanism for controlling the movements of a machine tool element, the combination with a plurality of positive jaw clutches arranged to be shifted into engagement in various combinations to effect movement in either direction and at either of two rates, of control mechanism operative to shift said clutches in manner to effect said movements and including a single pivotally mounted shifting element disposed to be pivoted in a single plane to a series of positions in effecting the various desired combinations of clutch engagements and operative to prevent undesired combinations of clutch engagements.

4. In a rate changing and reversing mechanism for controlling the movements of a machine tool element, the combination with a plurality of positive jaw clutches arranged to be shifted into engagement in various combinations to effect movement in either direction and at either of two rates, of control mechanism operative to shift said clutches in manner to effect said movements and including a single pivotally mounted shifting element disposed to be pivoted in a single plane to a series of positions in effecting the various desired combinations of clutch engagements and operative to prevent undesired combinations of clutch engagements, and a plurality of dog operated posts arranged to shift said shifting element in the one or the other direction respectively, said posts being in different planes to permit of individual operation by dogs on said machine tool element.

5. In a rate changing and reversing mechanism for controlling the movements of a machine tool element, the combination with a plurality of positive jaw clutches arranged to be shifted into engagement in various combinations to effect movement in either direction and at either of two rates, of control mechanism operative to shift said clutches in manner to effect said movements and including a single pivotally mounted shifting element disposed to be pivoted in a single plane to a series of positions in effecting the various desired combinations of clutch engagements and operative to prevent undesired combinations of clutch engagements, a plurality of dog operated posts arranged to shift said shifting element in the one or the other direction respectively, said posts being in different planes to permit of individual operation by dogs on said machine tool element, supplemental power actuated means arranged to move said shifting element to effect reversal and supplemental dog operated posts disposed to effect control of said power actuated means by supplemental dogs on said machine tool element.

6. In a rate changing and automatic reversing mechanism for a milling machine having a base and a reciprocating work table carried by said base, the combination with a source of power, of mechanism for driving said table including two clutch elements connected to be driven in opposite directions respectively and at rapid traverse rate, two table driving clutch elements respectively opposing said rapid traverse clutch elements in spaced relation thereto and connected to actuate said table, a pair of continuously meshing gears interposed respectively between said opposing rapid traverse and table driving clutch elements in co-axial relationship therewith, said gears being slidably mounted for axial movement and each having a clutch element on each face thereof for engagement selectively with the corresponding rapid traverse and table driving clutch elements respectively, driving means including an over-running clutch operatively connecting said source of power to said gears in manner to drive them at feed rate, shifting mechanism disposed to shift said gears axially to engage or disengage said clutches, control mechanism arranged to actuate said shifting mechanism to cause the one or the other of said gears to be shifted to engage its clutch element with the corresponding table driving clutch element for driving said table in selected direction at feed rate and to cause the gear not so engaged to be shifted to engage its clutch element with the corresponding rapid traverse clutch element for driving said table in the predetermined direction at rapid traverse rate, and power actuated means arranged to actuate said shifting mechanism upon said table arriving at a predetermined position in manner to so shift said gears as to effect reversal in the direction of travel of said table.

7. In a transmission mechanism for moving a part of a machine tool, the combination with two clutch elements disposed to be rotated in opposite directions respectively and at the same predetermined speed, two other clutch elements also disposed to be rotated in opposite directions respectively but both at another predetermined speed, means to couple any one of said clutch elements to said machine part to drive it selectively in either direction at either speed, means responsive to movement of said machine part to adjust said clutch coupling means to automatically change the speed of or to stop said machine part, and power actuated means responsive to movement of said machine part and operative to adjust said clutch coupling means to automatically effect reversal in the direction of movement of said machine part.

8. In a transmission mechanism for moving a part of a machine tool, the combination with two clutch elements disposed to be rotated in opposite directions respectively and at the same predetermined speed, two other clutch elements also disposed to be rotated in opposite directions respectively but both at another predetermined speed, means to couple any one of said clutch elements to said machine part to drive it selectively in either direction at either speed, means responsive to movement of said machine part to adjust said clutch coupling means to automatically change the speed of or to stop said machine part, power actuated means to adjust said clutch coupling means for automatically effecting reversal of said machine part and means adjustable to cause reversal to occur at either the one or the other of said predetermined speeds.

9. In a transmission mechanism for operating a movable element of a machine tool, the combination with rate changing and reversing gearing, of a single member operatively connected to shift said gearing to effect movement of said machine element in either direction at a selected one of a plurality of rates, power operated means disposed to actuate said shifting member to effect automatic reversal in the direction of movement of said machine element, and means to selectively limit the extent of movement of said shifting member by said power reversing means to determine the rate at which reverse movement of said machine element occurs.

10. In a machine tool having a base and a reciprocatory table carried thereby, the combination with power driving mechanism including reversing apparatus operatively connected to drive said table selectively in either direction, of a spring actuated shifting device including a stressed spring operatively connected to shift said reversing apparatus to reverse said table, a trip dog carried by said table and operative upon movement of said table to a predetermined position to release said stressed spring to initiate operation of said spring actuated reversing device, and means driven from said power driving mechanism and operative to restore said spring to its initial stressed condition as soon as a reversing operation has been completed to condition it for a subsequent reversing operation.

11. In a mechanical reversing mechanism for reversing the direction of movement of a machine tool element, the combination with driving means having a reversing device and connected to move said element, of a spring actuated member arranged to operate said reversing device to change the direction of movement of said element, trip mechanism disposed to be actuated by said element in the course of movement thereof to release said spring actuated member for effecting reversal upon movement of said element to a predetermined position, and means actuated by said trip mechanism prior to the release of said spring actuated member to positively predetermine the direction of movement of said reversing device by said spring actuated member.

12. In a machine tool having a reciprocatory work table, the combination with mechanical reversing gear movable to effect reversal of the direction of travel of said table, of a reversible electric motor associated with said mechanical reversing gear for shifting said gear in one direction or the other as may be necessary to effect reversal of said table, means carried by said table and arranged to effect energization of said motor in manner to cause reversal of said table upon its arrival at a predetermined position, and means associated with said mechanical reversing gear and operative thereby to de-energize said motor upon movement of said reversing gear to reverse position.

13. In a machine tool, the combination with a reciprocatory work supporting table, of power transmitting apparatus disposed to actuate said table including drive rate selecting mechanism and drive direction selecting mechanism, means disposed to operate said selecting mechanisms to effect desired combinations of rate and direction of drive, mechanically operated control means disposed to be actuated by said table in the course of its movement and arranged to control said selecting mechanism operating means in manner to effect change of drive rate of said table, and electrically operated control means disposed to be energized upon arrival of said table at a predetermined position to control said selecting mechanism operating means in manner to effect automatic reversal in the direction of drive of said table from movement at low rate in one direction to movement at low rate in the other direction.

14. In an electrically actuated reversing mechanism for the transmission of a machine tool, the combination with reversing gearing adapted to effect reversal selectively at any one of a plurality of speeds, an armature operatively connected to shift said reversing gearing, a solenoid disposed to cooperate with said gear shifting armature, and means arranged to position said solenoid for selectively shifting said gearing, whereby the speed at which reversal is to be effected by said reversing gearing may be preselected.

15. In an electrical gear shifting device, the combination with an armature, a cam plate arranged to be actuated by said armature and operatively connected to gearing to be shifted, of a solenoid mounted in cooperating relationship with said armature in manner to be movable relative thereto, and means to position said solenoid to preselect the mode of shifting of said gearing by said cam plate when said armature is acted upon by said solenoid.

16. A transmission and control mechanism for operating a movable element of a machine tool, comprising mechanical rate changing and reversing gearing, a shifting member operative to shift said gearing for effecting movement of said machine element in either direction at any one of a plurality of rates, an automatic reversing device including hydraulic actuating apparatus for moving said shifting member through neutral position, and adjustable means to limit the extent of movement of said shifting member by said hydraulic reversing device for controlling the rate at which reverse movement of said machine element occurs.

17. In a hydraulic actuating mechanism for moving a part of a machine tool, a cylinder and piston device arranged for hydraulic operation through a predetermined stroke, stop means disposed to be moved into position to engage said device in manner to limit said stroke, means to selectively position said stop means, and means operative upon completion of a stroke to render said stop means inoperative, whereupon further movement of said machine part may be effected manually without interference by said stop means.

18. In a rate changing and reversing mechanism for driving a machine tool member, a pair of driving clutch elements operatively connected to turn in opposite directions and connected to be driven at rapid traverse rate, a pair of driven clutch elements operatively connected to drive said machine tool member, a pair of intermediate clutch elements operatively connected to turn in opposite directions and each disposed to be engaged with one of said rapid traverse driving clutch elements or with one of said driven clutch elements selectively, and means including an overrunning clutch connected to drive said intermediate clutch elements at feed rate, the arrangement being such that said machine tool member may be driven in either direction at either feed rate or rapid traverse rate selectively upon suitably engaging said clutch elements.

19. In a rate changing and reversing mechanism for a milling machine having a rotatable cutter and a cooperating reciprocatory work table, the combination with a source of power, of a pair of meshing gears driven by said source of power at rapid traverse rate in manner to operate at equal speeds in opposite directions, a second pair of similar meshing gears, means including an overrunning clutch arranged to drive said second pair of gears at feed rate, said gears operating at equal speeds in opposite directions, clutches disposed to selectively couple either of said gears of said second pair to the corresponding one of said rapid traverse rate gears to selectively drive said second pair of gears at rapid traverse rate, a driving mechanism for actuating said work table, and clutches disposed to connect said driving mechanism selectively to either one of the gears of said second pair of gears to effect driving of said table in either direction at the rate determined by said first mentioned clutches.

20. A feed transmission mechanism for a driven member of a machine tool, comprising two clutch elements driven at rapid traverse rate, two respectively complementary clutch elements driven at feed rate, an overrunning clutch associated with said feed rate clutch elements to permit rotation thereof at a rate faster than feed rate when either one thereof is engaged with its corresponding rapid traverse clutch element, means operatively connecting said feed rate clutch elements in manner to cause them to rotate simultaneously, a forward driving clutch element operatively associated with one of said feed rate clutch elements in manner to be driven thereby selectively for actuating said driven member in one direction, and a reverse driving clutch element operatively associated with the other of said feed rate clutch elements in manner to be driven thereby selectively for actuating said driven member in the other direction.

21. In a machine tool transmission mechanism, the combination with rate changing and reversing gearing, of means for shifting said gearing to effect operation in either direction at a selected one of a plurality of rates said shifting means including a power actuated reversing device, and means to selectively limit the movement of said device in effecting reversal for determining the rate at which reversal occurs.

22. In a machine tool having a base, a reciprocatory work table carried by said base, and a source of power for driving said table, the combination with a reversing mechanism disposed to effect operation of said table by said power source selectively in either direction, of a power actuated reverser disposed to shift said reversing mechanism to reverse said table, said reverser including an actuating spring and a cooperating latch normally retaining said spring in stressed condition, a trip dog carried by said table and operative upon movement of said table to a predetermined position to release said latch thereby permitting said spring to exert force to shift said reversing mechanism, and means driven by said source of power and operative after a reversing operation to restore said spring to and latch it in its stressed condition preparatory to effecting a subsequent reversing operation.

23. In a transmission mechanism for actuating a reciprocatory element of a machine tool, a reverse gear mechanism having a neutral point, mechanical operating means for reversing said gear mechanism by movement thereof through said neutral point, an electro-magnetically operated means disposed to be energized upon said reciprocatory element arriving at a predetermined position to actuate said mechanical operating means in manner to move said reverse gear mechanism through said neutral point to reverse position thereby reversing the direction of movement of said reciprocatory element, and trip means associated with said reciprocatory element and mechanically connected to said operating means in manner to move said reverse gear mechanism to said neutral point upon said element arriving at another predetermined position to stop said element.

24. In a machine tool, the combination with a frame carrying a rotatably journaled cutter spindle and a reciprocatory work table, of driving means for said spindle and said table, reversing mechanism operatively connected to transmit motion from said driving means to said table to move said table selectively in either of two directions, electrically operated means disposed to actuate said reversing mechanism in manner to cause said table to move in one of said directions, other electrically operated means disposed to actuate said reversing mechanism in manner to cause said table to move in the other of said directions, and a switch operatively associated with each of said electrically operated reverse actuating means, said switches being disposed to be actuated by said table in the course of movement thereof in one direction and in the other direction respectively.

25. A transmission and control mechanism for operating a movable element of a machine tool, comprising mechanical rate changing and reversing gearing, a shifting member operative to shift said gearing for effecting movement of said machine element in either direction at any one of a plurality of rates, an automatic reversing device including hydraulic actuating apparatus for moving said shifting member through neutral position, and a hydraulically controlled stop member disposed to selectively limit the movement of said shifting member by said automatic reversing device for controlling the rate at which reverse movement of said machine element occurs.

26. In a machine tool, the combination with a driven member and a source of power, of a transmission mechanism for selectively connecting said source of power to said driven member comprising two clutch elements arranged to be driven at rapid traverse rate in opposite directions respectively, two complementary clutch elements disposed to be coupled respectively with said rapid traverse clutch elements selectively for rotation thereby, means for selectively connecting said complementary clutch elements with said driven member, and means including an overrunning clutch connected to drive said complementary clutch elements at feed rate in opposite direction respectively when they are disengaged from said rapid traverse clutch elements, the arrangement being such that said driven member may be actuated selectively in either direction at either rate.

27. In a machine tool having a driven element, the combination with a control lever arranged to assume a central neutral position and to be moved in a plane to two operative positions at each side of said central position, of a pair of clutch elements arranged to be driven in opposite directions respectively at feed rate, another pair of clutch elements arranged to be driven in opposite directions respectively at rapid traverse rate, clutch mechanism for effecting a driving connection from any one of said clutch elements to said driven element for driving it in either direction at either rate, and shifting mechanism operatively connecting said control lever with said clutch mechanism for effecting shifting thereof in manner to effect feeding movement or rapid traverse movement in one direction when shifted to the two positions respectively at one side of said neutral position and to effect feeding movement or rapid traverse movement in the other direction when shifted to the two positions respectively at the other side of said neutral position.

28. In a transmission mechanism for operating a movable element of a machine tool, the combination with rate changing and reversing gearing, of means operatively connected for shifting said gearing to effect movement of said machine element in a selected direction and at a selected rate, power operated means responsive to movement of said element in either direction to actuate said shifting means for effecting automatic reversal in the direction of movement of said element, and control means selectively operable to render said power operated reversing means non-responsive to movement of said element in either of its directions of movement.

29. In a transmission mechanism for operating a movable element of a machine tool, the combination with rate changing and reversing gearing, of means operatively connected for shifting said gearing to effect movement of said machine element in a selected direction and at a selected rate, power operated means responsive to movement of said element in either direction to actuate said shifting means for effecting automatic reversal in the direction of movement of said element, and control means selectively operable to predetermine the rate at which reverse movement of said element may be effected by said power operated means.

30. In a transmission mechanism for operating a movable element of a machine tool, the combination with rate changing and reversing gearing, of means operatively connected for shifting said gearing to effect movement of said machine element in a selected direction and at a selected rate, power operated means responsive to movement of said element in either direction to actuate said shifting means for effecting automatic reversal in the direction of movement of said element, and control means selectively operable to predetermine the rate at which reverse movement of said element may be effected by said power operated means in either direction of movement of said element.

31. In a hydraulic control system for a machine tool, the combination with a hydraulically actuated member, of a control valve for controlling the admission of pressure fluid to said hydraulically actuated member, pressure operated means for moving said control valve to admit pressure to said member, and a valve actuated by pressure fluid flowing from said hydraulically actuated member to de-energize said pressure operated means for moving said control valve whereupon said valve may be returned automatically to its initial position.

32. In a rate changing and reversing mechanism for automatically controlling the movements of a machine tool member, the combination with a plurality of positive jaw clutches arranged to be engaged selectively in a plurality of combinations to effect movement of said member in either direction and at either rapid traverse or feed rate, of control mechanism operative to engage said clutches in the combinations to effect said movements, including a single shifting element arranged to be moved from a central neutral position in either direction first to a feed position and then to a rapid traverse position.

33. In a rate changing and reversing mechanism for automatically controlling the movements of a machine tool member, the combination with a plurality of positive jaw clutches arranged to be engaged selectively in a plurality of combinations to effect movement of said member in either direction and at either rapid traverse or feed rate, of control mechanism operative to engage said clutches in the combinations to effect said movements, including a single shifting element arranged to be moved from a central neutral position in either direction first to a feed position and then to a rapid traverse position, means actuated by said movable machine member for moving said shifting element from either rapid traverse position through the corresponding feed position to said neutral position, supplemental power actuated means arranged to act upon said shifting element simultaneously with said member actuated means and operative to move said shifting element through said neutral position to reverse the direction of movement of said machine tool member automatically, and control means selectively operable to stop said shifting element at either the feed or the rapid traverse position when moved by said supplemental power means, whereby automatic reversal of said member may be effected selectively at either feed rate or rapid traverse rate.

34. In a rate changing and reversing mechanism for automatically controlling the movements of a machine tool member, the combination with a plurality of positive jaw clutches arranged to be engaged selectively in a plurality of combinations to effect movement of said member in either direction and at either rapid traverse or feed rate, of control mechanism operative to engage said clutches in the various combinations to effect said movements, including a single shifting element arranged to be moved from a central neutral position in either direction first to a feed position and then to a rapid traverse position, and means actuated by said movable machine member for moving said shifting element from either rapid traverse position through the corresponding feed position to said neutral position.

35. In a rate changing and reversing mechanism for automatically controlling the movements of a machine tool member, the combination with a plurality of positive jaw clutches arranged to be engaged selectively in a plurality of combinations to effect movement of said member in either direction and at either rapid traverse or feed rate, of control mechanism operative to engage said clutches in the various combinations to effect said movements, including a single shifting element arranged to be moved from a central neutral position in either direction first to a feed position and then to a rapid traverse position, means actuated by said movable machine member for moving said shifting element from either rapid traverse position through the corresponding feed position to said neutral position, and supplemental power actuated means arranged to act upon said shifting element simultaneously with said member actuated means and operative to move said shifting element through said neutral position to reverse the direction of movement of said machine tool member automatically.

36. In a machine tool transmission mechanism, an overrunning clutch, means for driving said overrunning clutch at feed rate, two transmission elements interconnected to rotate in opposite directions and connected to be driven by said overrunning clutch, a movable member disposed to be operatively connected selectively to one or the other of said transmission elements for operation thereby in either direction, and two driving members disposed to operate in opposite directions at rapid traverse rate and arranged to be operatively connected selectively to whichever one of said transmission elements is not connected to said movable member for operating said movable member at rapid traverse rate in the direction determined by the transmission element connected to said movable member.

37. In a machine tool having a transmission mechanism for driving a support, the combination with two driving elements interconnected and driven to rotate in opposite directions respectively at equal speeds and two other driving elements also interconnected and driven to rotate in opposite directions respectively at equal speeds differing from the speeds of said first driving elements, of means to couple any one of said driving elements to said support to drive it selectively in either direction at either speed, and means responsive to movement of said support to adjust said coupling means for automatically changing the speed, reversing, or stopping said support selectively.

38. In a machine tool having a base, a reciprocatory supporting member carried by said base, a source of power for driving said supporting member, reversing mechanism arranged to effect movement of said member by said power source in either direction selectively, a manually actuatable shifting device disposed to shift said reversing mechanism to reverse the direction of movement of said member, a power actuated shifting device including a stressed spring operative to shift said reversing mechanism, tripping mechanism operative upon movement of said supporting member to a predetermined position to release said stressed spring for actuating said reverse shifting device, and power driven means functioning upon completion of said reversing operation to restore said spring to stressed condition preparatory to a subsequent reversing operation thereby releasing said reversing mechanism for movement by said manually actuatable shifting device.

39. In a machine tool having a base, a reciprocatory supporting member carried by said base, a source of power for actuating said supporting member, reversing mechanism arranged to effect movement of said supporting member by said power source in either direction selectively, a manually actuatable shifting device arranged to shift said reversing mechanism to reverse the direction of travel of said supporting member, a power actuated shifting device operative to shift said reversing mechanism, tripping mechanism operative upon movement of said supporting member to a predetermined position to release said power actuated shifting device for operating said reversing mechanism automatically, and means functioning subsequent to an automatic reversing operation to restore said power actuated shifting device to its initial position preparatory to another reversing operation thereby releasing said reversing mechanism for movement by said manually actuatable shifting device.

40. In power actuated mechanism for moving an element of a machine tool, an actuating member arranged for power operation through a predetermined stroke, stop means disposed to be moved selectively into position to engage said actuating member in manner to limit its stroke of movement, and means operative upon completion of a stroke so limited to render said stop means ineffective, whereupon further movement of said machine element may be effected by other means without interference by said stop means.

41. In a machine tool, a support moving rate changing and reversing mechanism adapted to control the movements of a support automatically, a plurality of shiftable transmission elements arranged to be engaged in a plurality of combinations to effect movement of said member in either direction at either rapid traverse rate or feed rate, and control mechanism for shifting said transmission elements in manner to effect said movements including a single shifting element disposed to be moved from a central neutral position in either direction first to a feed rate position and then to a rapid traverse rate position for effecting movement of said member in the respective directions, the arrangement being such that upon reversing movement of said shifting element said shiftable transmission elements invariably effect feed rate movement in the initial direction and then feed rate movement in the reverse direction, whereby direct reversal from rapid traverse rate or into rapid traverse rate is prevented.

42. In a machine tool having a power actuated movable supporting member, a control system including a reverser operable to reverse the direction of movement of said member at predetermined points in its path of movement, a rate changer operable during a reversing operation to establish a low rate of movement immediately prior to and subsequent to reversal in the direction of movement of said member, and selectively actuatable means associated with said reverser and operative upon said rate changer to establish a predetermined rate of movement subsequent to completion of said reversal.

43. In a machine tool, a support moving transmission mechanism including an overrunning clutch, means for driving said overrunning clutch at feed rate, two shiftable transmission elements interconnected to rotate in opposite directions respectively and connected to be driven by said overrunning clutch, two support driving elements arranged to be operatively engaged by one or the other of said shiftable transmission elements for operation thereby to move said support in either direction, and two driving members disposed to operate in opposite directions respectively at rapid traverse rate and arranged to be operatively engaged by said shiftable transmission elements, said overrunning clutch permitting operation thereof at rapid traverse rate.

44. In a machine tool, a support moving transmission mechanism including an overrunning clutch, means for driving said overrunning clutch at feed rate, two shiftable transmission elements interconnected to rotate in opposite directions respectively and connected to be driven by said overrunning clutch, two support driving elements arranged to be operatively engaged by one or the other of said shiftable transmission elements for operation thereby to move said support in either direction, two driving members disposed to operate in opposite directions respectively at rapid traverse rate and arranged to be operatively engaged by said shiftable transmission elements, said overrunning clutch permitting operation thereof at rapid traverse rate, and means for shifting said shiftable transmission elements including a single control member movable from a central neutral position in one direction to forward feed rate and rapid traverse rate positions successively and in the other direction to reverse feed rate and rapid traverse rate positions successively, whereby reversal is invariably effected from feed rate in one direction to feed rate in the other direction.

45. In a machine tool, a support moving transmission mechanism including an overrunning clutch, means for driving said overrunning clutch at feed rate, two shiftable transmission elements interconnected to rotate in opposite directions respectively and connected to be driven by said overrunning clutch, two support driving elements arranged to be operatively engaged by one or the other of said shiftable transmission elements for operation thereby to move said support in either direction, two driving members disposed to operate in opposite directions respectively at rapid traverse rate and arranged to be operatively engaged by said shiftable transmission elements, said overrunning clutch permitting operation thereof at rapid traverse rate, and control means for said shiftable transmission elements including a single shifting element arranged to be moved from a central neutral position in either direction first to a feed position and then to a rapid traverse position.

46. In a machine tool, a support moving transmission mechanism including an overrunning clutch, means for driving said overrunning clutch at feed rate, two shiftable transmission elements interconnected to rotate in opposed directions respectively and connected to be driven by said overrunning clutch, two support driving elements arranged to be operatively engaged by one or the other of said shiftable transmission elements for operation thereby to move said support in either direction, two driving members disposed to operate in opposite directions respectively at rapid traverse rate and arranged to be operatively engaged by said shiftable transmission elements, control means for said shiftable transmission elements including a member movable from a neutral position to feed or rapid traverse positions successively, trip mechanism operative in response to movement of said movable support to actuate said movable member between said feed and rapid traverse positions or into said neutral position, and power operated automatic reversing mechanism responsive to movement of said movable member to a predetermined position and operative to move said control member across said neutral position between forward feed position and reverse feed position automatically.

JOSEPH B. ARMITAGE.